United States Patent
DeHart et al.

(10) Patent No.: US 10,417,595 B2
(45) Date of Patent: Sep. 17, 2019

(54) TIME-BASED, DEMAND-PULL PRODUCTION

(71) Applicant: DeHart Consulting, LLC, Camarillo, CA (US)

(72) Inventors: Dale DeHart, Camarillo, CA (US); Norm Cota, Camarillo, CA (US)

(73) Assignee: DEHART CONSULTING, LLC, Camarillo, CA (US)

( * ) Notice: Subject to any disclaimer, the term of this patent is extended or adjusted under 35 U.S.C. 154(b) by 0 days.

(21) Appl. No.: 15/588,084

(22) Filed: May 5, 2017

(65) Prior Publication Data

US 2018/0322425 A1 Nov. 8, 2018

(51) Int. Cl.
*G06Q 10/06* (2012.01)
*G06Q 10/08* (2012.01)

(52) U.S. Cl.
CPC ....... *G06Q 10/0633* (2013.01); *G06Q 10/087* (2013.01)

(58) Field of Classification Search
CPC .............. G06Q 10/0633; G06Q 10/087
USPC ........................................ 705/7.27
See application file for complete search history.

(56) References Cited

U.S. PATENT DOCUMENTS

| | | |
|---|---|---|
| 4,676,090 A | 6/1987 | Nishimura et al. |
| 4,759,123 A | 7/1988 | Ohta et al. |
| 4,827,423 A | 5/1989 | Beasley et al. |
| 5,040,123 A | 8/1991 | Barber et al. |
| 5,093,794 A | 3/1992 | Howie et al. |
| 5,193,065 A | 3/1993 | Guerindon et al. |
| 5,204,821 A | 4/1993 | Inui et al. |
| 5,233,533 A | 8/1993 | Edstrom et al. |
| 5,278,750 A | 1/1994 | Kaneko et al. |
| 5,285,392 A | 2/1994 | Kyle et al. |
| 5,440,480 A | 8/1995 | Costanza |
| 5,442,561 A | 8/1995 | Yoshizawa et al. |
| 5,528,489 A | 6/1996 | Asahara et al. |
| 5,544,348 A | 8/1996 | Umeda et al. |
| 5,612,886 A | 3/1997 | Weng |
| 5,655,086 A | 8/1997 | Jury et al. |
| 5,751,580 A * | 5/1998 | Chi .................. G05B 19/41865 700/101 |
| 5,778,386 A | 7/1998 | Lin et al. |
| 5,787,000 A | 7/1998 | Lilly et al. |
| 5,918,054 A | 6/1999 | Jury et al. |
| 5,930,763 A | 7/1999 | Kaneko et al. |
| 5,937,197 A | 8/1999 | Jury |
| RE36,360 E | 10/1999 | Costanza |
| 5,963,919 A | 10/1999 | Brinkley et al. |

(Continued)

OTHER PUBLICATIONS

Al-Tahat, M., & Rawabdeh, I. A. (2008). Stochastic analysis and design of CONWIP controlled production systems. Journal of Manufacturing Technology Management, 19(2), 253-273. doi:http://dx.doi.org/10.1108/17410380810847945 (Year: 2008).*

(Continued)

*Primary Examiner* — Folashade Anderson
(74) *Attorney, Agent, or Firm* — Lewis Roca Rothgerber Christie LLP

(57) ABSTRACT

Work at each Work Center in a production system is authorized by a demand-pull system. The demand-pull system can be based on the time for the oldest unauthorized work order in upstream adjacent WCs to get to the next WC and whether that WC will be ready to receive it.

28 Claims, 17 Drawing Sheets

(56) References Cited

U.S. PATENT DOCUMENTS

| | | |
|---|---|---|
| 5,993,041 A | 11/1999 | Toba |
| 6,005,571 A | 12/1999 | Pachauri |
| 6,078,900 A | 6/2000 | Ettl et al. |
| 6,088,626 A | 7/2000 | Lilly et al. |
| 6,090,262 A | 7/2000 | Ide et al. |
| 6,128,588 A | 10/2000 | Chacon |
| 6,170,630 B1 | 1/2001 | Goss et al. |
| 6,198,980 B1 | 3/2001 | Costanza |
| 6,236,901 B1 | 5/2001 | Goss |
| 6,259,959 B1 | 7/2001 | Martin |
| 6,437,705 B1 | 8/2002 | Barich et al. |
| 6,446,912 B1 | 9/2002 | Barich et al. |
| 6,453,823 B1 | 9/2002 | Barich et al. |
| 6,513,231 B1 | 2/2003 | Hafenrichter et al. |
| 6,516,242 B1 | 2/2003 | Brown |
| 6,553,279 B2 | 4/2003 | Brown |
| 6,564,113 B1 | 5/2003 | Barto et al. |
| 6,594,535 B1 | 7/2003 | Costanza |
| 6,623,231 B2 | 9/2003 | Elger |
| 6,643,556 B1 | 11/2003 | Morenz et al. |
| 6,725,113 B1 | 4/2004 | Barto et al. |
| 6,769,162 B1 | 8/2004 | Barich et al. |
| 6,782,302 B1 | 8/2004 | Barto et al. |
| 6,785,581 B2 | 8/2004 | Mountcastle et al. |
| 6,801,819 B1 | 10/2004 | Barto et al. |
| 6,813,540 B2 | 11/2004 | Scotti et al. |
| 6,862,487 B2 | 3/2005 | Yamanaka et al. |
| 6,876,895 B2 | 4/2005 | Seimiya et al. |
| 6,889,178 B1 | 5/2005 | Chacon |
| 6,907,305 B2 | 6/2005 | Mata et al. |
| 6,964,837 B2 | 11/2005 | Schrof et al. |
| 6,969,695 B2 | 11/2005 | Kuboyama et al. |
| 6,970,756 B2 | 11/2005 | Levionnois |
| 6,989,349 B2 | 1/2006 | Tatewaki et al. |
| 6,993,492 B2 | 1/2006 | George et al. |
| 7,010,373 B2 | 3/2006 | Fukushima et al. |
| 7,020,594 B1 | 3/2006 | Chacon |
| 7,027,884 B2 | 4/2006 | Watanabe et al. |
| 7,027,885 B1 | 4/2006 | Barto et al. |
| 7,043,318 B1 | 5/2006 | Barto et al. |
| 7,054,699 B2 | 5/2006 | Nakamura |
| 7,054,702 B1 | 5/2006 | Barto et al. |
| 7,065,567 B1 | 6/2006 | Squires et al. |
| 7,069,097 B1 | 6/2006 | Barto et al. |
| 7,072,731 B1 | 7/2006 | Barto et al. |
| 7,107,113 B1 | 9/2006 | Morenz et al. |
| 7,107,120 B2 | 9/2006 | Furukawa et al. |
| 7,127,310 B1 | 10/2006 | Barto et al. |
| 7,236,844 B1 | 6/2007 | Bai et al. |
| 7,251,539 B2 | 7/2007 | Nishimoto et al. |
| 7,257,454 B2 | 8/2007 | Chien |
| 7,286,898 B2 | 10/2007 | Parmenter et al. |
| 7,336,177 B2 | 2/2008 | Onderko et al. |
| 7,337,032 B1 | 2/2008 | Nettles et al. |
| 7,376,599 B1 | 5/2008 | Gerhardt |
| 7,406,358 B2 | 7/2008 | Preiss |
| 7,434,730 B2 | 10/2008 | Jain |
| 7,463,939 B1 | 12/2008 | Mata et al. |
| 7,499,766 B2 | 3/2009 | Knight et al. |
| 7,610,111 B2 | 10/2009 | Lin et al. |
| 7,668,767 B1 | 2/2010 | Borsand |
| 7,711,612 B1 | 5/2010 | Farias et al. |
| 7,719,422 B1 | 5/2010 | Steinmetz et al. |
| 7,742,977 B1 | 6/2010 | Borsand |
| 7,753,279 B2 | 7/2010 | Sells et al. |
| 7,761,336 B1 | 7/2010 | Blankenship et al. |
| 7,765,114 B2 | 7/2010 | Frick |
| 7,813,993 B1 | 10/2010 | Barto et al. |
| 7,844,525 B2 | 11/2010 | Borsand |
| 7,896,243 B2 | 3/2011 | Herskowitz |
| 7,941,236 B2 | 5/2011 | Spearman |
| 7,941,362 B2 | 5/2011 | Borsand |
| 7,970,484 B2 | 6/2011 | Fontanot |
| 7,996,276 B2 | 8/2011 | Blankenship et al. |
| 8,033,380 B2 | 10/2011 | Tsujihama et al. |
| 8,108,989 B2 | 2/2012 | Muhlenkamp et al. |
| 8,117,103 B2 | 2/2012 | Macy et al. |
| 8,170,893 B1 | 5/2012 | Rossi |
| 8,174,630 B2 | 5/2012 | Hsu et al. |
| 8,209,242 B1 | 6/2012 | Henderson et al. |
| 8,266,066 B1 | 9/2012 | Wezter et al. |
| 8,274,367 B2 | 9/2012 | Maeda et al. |
| 8,340,990 B2 | 12/2012 | Cline et al. |
| 8,364,608 B2 | 1/2013 | Hammer et al. |
| 8,364,715 B2 | 1/2013 | Schoknecht et al. |
| 8,370,272 B2 | 2/2013 | Wickel et al. |
| 8,374,931 B2 | 2/2013 | Bhatia et al. |
| 8,387,858 B2 | 3/2013 | Bohn et al. |
| 8,392,364 B2 | 3/2013 | Horn et al. |
| 8,396,751 B2 | 3/2013 | Becker et al. |
| 8,396,768 B1 | 3/2013 | Kaisermayr et al. |
| 8,401,891 B2 | 3/2013 | Macy et al. |
| 8,402,473 B1 | 3/2013 | Becker et al. |
| 8,412,603 B2 | 4/2013 | Santhosh et al. |
| 8,413,165 B2 | 4/2013 | Lindemann et al. |
| 8,417,588 B2 | 4/2013 | Ringl et al. |
| 8,423,418 B2 | 4/2013 | Hald et al. |
| 8,463,666 B2 | 6/2013 | Dorais et al. |
| 8,468,544 B1 | 6/2013 | Becker et al. |
| 8,473,317 B2 | 6/2013 | Santoso et al. |
| 8,515,794 B2 | 8/2013 | Duparc et al. |
| 8,515,834 B2 | 8/2013 | Henderson et al. |
| 8,521,621 B1 | 8/2013 | Hetzer et al. |
| 8,521,670 B2 | 8/2013 | Paguio |
| 8,521,838 B2 | 8/2013 | Bestfleisch et al. |
| D689,127 S | 9/2013 | Adjei |
| 8,538,791 B2 | 9/2013 | Novales et al. |
| 8,544,159 B2 | 10/2013 | Muhlenkamp et al. |
| 8,554,586 B2 | 10/2013 | Barth et al. |
| 8,554,637 B2 | 10/2013 | Becker et al. |
| 8,560,392 B2 | 10/2013 | Asal et al. |
| 8,566,185 B2 | 10/2013 | Bartelt et al. |
| 8,566,193 B2 | 10/2013 | Singh et al. |
| 8,571,961 B1 | 10/2013 | Dvorak et al. |
| 8,572,552 B2 | 10/2013 | Kennaley |
| 8,577,760 B2 | 11/2013 | Rutsch et al. |
| 8,601,490 B2 | 12/2013 | Sureshan et al. |
| 8,605,434 B2 | 12/2013 | Chao |
| 8,606,717 B2 | 12/2013 | Gross |
| 8,606,723 B2 | 12/2013 | Seubert et al. |
| 8,615,451 B1 | 12/2013 | Thiele et al. |
| 8,634,514 B2 | 1/2014 | Vandergheynst |
| 8,655,705 B2 | 2/2014 | Riepshoff et al. |
| 8,655,756 B2 | 2/2014 | Seubert et al. |
| 8,666,845 B2 | 3/2014 | Sachs et al. |
| 8,671,031 B2 | 3/2014 | Henderson et al. |
| 8,671,041 B2 | 3/2014 | Haaf et al. |
| 8,671,064 B2 | 3/2014 | Schmitt et al. |
| 8,688,462 B2 | 4/2014 | Gross |
| 8,694,397 B2 | 4/2014 | Seubert et al. |
| 8,700,538 B2 | 4/2014 | Gross |
| 8,712,867 B2 | 4/2014 | Gross |
| 8,725,654 B2 | 5/2014 | Richter et al. |
| 8,730,036 B2 | 5/2014 | Tsujihama et al. |
| 8,732,083 B2 | 5/2014 | Seubert et al. |
| 8,744,937 B2 | 6/2014 | Seubert et al. |
| 8,756,135 B2 | 6/2014 | Klein et al. |
| 8,756,274 B2 | 6/2014 | Hanumolu et al. |
| 8,762,453 B2 | 6/2014 | Vins et al. |
| 8,762,454 B2 | 6/2014 | Kohlhaas et al. |
| 8,775,280 B2 | 7/2014 | Zech et al. |
| 8,781,882 B1 | 7/2014 | Arboletti et al. |
| 8,799,115 B2 | 8/2014 | Schmitt |
| 8,805,564 B2 | 8/2014 | Fontanot et al. |
| 8,924,269 B2 | 12/2014 | Seubert et al. |
| 8,930,248 B2 | 1/2015 | Hubert et al. |
| 8,949,855 B2 | 2/2015 | Bettin et al. |
| 8,965,539 B2 | 2/2015 | Hayes et al. |
| 8,984,050 B2 | 3/2015 | Hanumolu et al. |
| 8,989,879 B2 | 3/2015 | Hayes et al. |
| 9,015,059 B2 | 4/2015 | Sims et al. |
| 9,043,236 B2 | 5/2015 | Kahn et al. |
| 9,047,578 B2 | 6/2015 | Dvorak et al. |
| 9,065,174 B2 | 6/2015 | Sato et al. |

(56) References Cited

U.S. PATENT DOCUMENTS

| | | | |
|---|---|---|---|
| 9,076,112 | B2 | 7/2015 | Kahn et al. |
| 9,096,026 | B2 | 8/2015 | Hall et al. |
| 9,117,187 | B2 | 8/2015 | Frederick et al. |
| 9,134,944 | B1* | 9/2015 | Platt ................ G06F 3/1204 |
| 9,135,585 | B2 | 9/2015 | Bader et al. |
| 9,135,604 | B2 | 9/2015 | Ritter et al. |
| 9,183,521 | B2 | 11/2015 | Henderson et al. |
| 9,191,343 | B2 | 11/2015 | Stollarski et al. |
| 9,191,357 | B2 | 11/2015 | Stollarski et al. |
| 9,202,166 | B2 | 12/2015 | James |
| 9,208,468 | B2 | 12/2015 | Olson et al. |
| 9,216,811 | B2 | 12/2015 | Ruffray et al. |
| 9,232,368 | B2 | 1/2016 | Vins et al. |
| 9,237,425 | B2 | 1/2016 | Vins et al. |
| 9,239,719 | B1 | 1/2016 | Feinstein et al. |
| 9,246,869 | B2 | 1/2016 | Pfitzner et al. |
| 9,261,950 | B2 | 2/2016 | Gu et al. |
| 9,323,968 | B2 | 4/2016 | Pudenz et al. |
| 9,342,764 | B1 | 5/2016 | Gross et al. |
| 9,367,826 | B2 | 6/2016 | Buecheler et al. |
| 9,400,998 | B2 | 7/2016 | Albers et al. |
| 9,429,297 | B2 | 8/2016 | Lin et al. |
| 2004/0004735 | A1* | 1/2004 | Oakeson ............ G06F 3/1212 358/1.15 |
| 2004/0067601 | A1* | 4/2004 | Sun .............. G05B 19/41865 438/14 |
| 2005/0154625 | A1 | 7/2005 | Chua et al. |
| 2006/0018224 | A1* | 1/2006 | Bang .................. G11B 19/04 369/47.48 |
| 2006/0282346 | A1* | 12/2006 | Kernodle ......... G06Q 10/06 705/28 |
| 2007/0205867 | A1* | 9/2007 | Kennedy ............ H04W 99/00 340/10.1 |
| 2008/0065253 | A1* | 3/2008 | Daferner .......... G05B 19/41865 700/116 |
| 2010/0270372 | A1* | 10/2010 | Bae .................. G06Q 10/06 235/380 |
| 2011/0303510 | A1 | 12/2011 | Horn |
| 2012/0095797 | A1* | 4/2012 | Nishimura .......... G06F 21/6236 705/7.13 |
| 2012/0095926 | A1* | 4/2012 | Nishimura .......... G06Q 10/103 705/301 |
| 2012/0136758 | A1 | 5/2012 | Parente et al. |
| 2012/0165968 | A1* | 6/2012 | Fontanot .......... G05B 19/41865 700/101 |
| 2014/0172344 | A1* | 6/2014 | Laird .............. G01R 31/2894 702/117 |
| 2015/0149351 | A1* | 5/2015 | Kagiwada ............ G06Q 20/10 705/40 |
| 2016/0140473 | A1* | 5/2016 | Hodes .............. G06Q 10/063 705/7.21 |

OTHER PUBLICATIONS

Aithal, K.S., Narahari, Y., and Manjunath, E., "Modelling, analysis, and acceleration of a printed circuit board fabrication process," Sadahana, vol. 26, part 5, Oct. 2001, pp. 447-463, India.

Eng, Chong Kuan, Ching, How Whee, Siong, Bong Cheng, "Paired-cell Overlapping Loops of Cards with Authorization Simulation in Job shop Environment," International Journal of Mechanical & Mechatronics Engineering IJMME-IJENSvol.15 No. 03, Jun. 2015.

Heston, Tim, "Need a light-now? Lighting manufacturer responds fast and wins more business", The fabricator, Oct. 2011.

Karmarkar, Uday S., "Controlling M.P. and Leadtimes in Job Shops", William E. Simon Graduate School of Business Administration, University of Rochester. Published 1987.

Suri, Rajan, "Its' About Time the Competitive Advantage of Quick Response Manufacturing", Appendix A, "Tips for Calculating Manufacturing Critical-path Time (MCT) and Creating MCT Maps," CRC Press Taylor and Francis Group. Published in 2010.

Suri, Rajan, "Its' About Time the Competitive Advantage of Quick Response Manufacturing", Appendix B, "Practical Examples of Focused Target Market Segment (FTMS) Selection," CRC Press Taylor and Francis Group.Published in 2010.

Suri, Rajan, "Its' About Time the Competitive Advantage of Quick Response Manufacturing", Appendix C, "Examples of How to Think Outside the Box When Creating Quick Response Manufacturing (QRM) Cells," CRC Press Taylor and Francis Group. Published in 2010.

Suri, Rajan, "Its' About Time the Competitive Advantage of Quick Response Manufacturing", Appendix D, "Simple System Dynamics Calculations for Quick Insights," CRC Press Taylor and Francis Group.Published in 2010.

Suri, Rajan, "Its' About Time the Competitive Advantage of Quick Response Manufacturing", Appendix E, "Implementing POLCA: The Material Control System for Low-Volume and Custom Products," CRC Press Taylor and Francis Group.Published in 2010.

Suri, Rajan, "QRM and POLCA: A Winning Combination for Manufacturing Enterprises in the 21st Century", Technical Report, Center for Quick Response Manufacturing, May 2003.

Turbino, Francisco and Suri, Rajan, "What Kind of "Numbers" can a Company Expect After Implementing Quick Response Manufacturing? Empirical data from several projects on Lead Time Reduction", Quick Response Manufacturing 2000 Conference Proceedings, R. Suri (Ed.), Society of Manufacturing Engineers Press, Dearborn, MI, 2000, pp. 943-972.

Reiter, Stanley, "*A System for Managing Job-Shop Production*", The Journal of Business of the University of Chicago, vol. 39, No. 3 (Jul. 1966), pp. 371-393.

International Search Report and Written Opinion for corresponding International Application No. PCT/US2018/031462, dated Aug. 31, 2018 (11 sheets).

* cited by examiner

FIG. 1

| WC | Review | 115 | 125 | 130 | 135 | 140 | 145 | 150 | 152 | 155 |
|---|---|---|---|---|---|---|---|---|---|---|
| Review | | | | | | | | | | |
| 115 | UA | | | | | | | | | |
| 125 | | UA | | | | | | | | |
| 130 | | | UA | | | | | | | |
| 135 | | UA | UA | | | | | | | |
| 140 | | UA | | UA | | | | | | |
| 145 | | | | | | | | | | |
| 150 | | | UA | | UA | | | | UA | |
| 152 | | | | | | | | UA | | |
| 155 | | | | | | | | | | |

UPSTREAM ADJACENT WORK CENTERS

| # | $t_{wo1, n-1}$ | $t_{T, N-1, N}$ | $t_{R, N}$ | $Q_N$ | $Y_N$ | $C_N$ | $t_{R, N-1}$ | $t_{Q, N-1}$ | $C_{N-1}$ | FLOW TIME FOR $WO_1$ $t_{wo1, n-1} + t_{T, N-1, N}$ | TIME TO CONSUME DOWNSTREAM WOs $t_{R,N} + (Q_N + Y_N)/C_N$ $+ t_{R, N-1} + t_{Q, N-1}/C_{N-1}$ | AUTHORIZE ? |
|---|---|---|---|---|---|---|---|---|---|---|---|---|
| 1 | 4 | 10 | 2 | 5 | 9 | 2 | 2 | 3 | 1 | 14 | 14 | YES |
| 2 | 6 | 10 | 2 | 5 | 9 | 2 | 2 | 3 | 1 | 16 | 14 | YES |
| 3 | 4 | 10 | 2 | 5 | 12 | 2 | 2 | 3 | 1 | 14 | 15.5 | NO |
| 4 | 4 | 1 | 2 | 5 | 9 | 2 | 2 | 3 | 1 | 5 | 14 | NO |

FIG. 3A

TIME-BASED, DEMAND-PULL PRODUCTION

BACKGROUND

Since the early 1980's, the benefits of producing a given production volume throughput with the minimum amount of inventory have been well documented. Beginning with the Just-in-Time methodologies, using Kanban cards for inventory replenishment, to Demand Flow methodologies, like that posited by Suri (Paired-cell Overlapping Loops of Cards with Authorization, or POLCA) of the Quick Response Manufacturing Institute in 1998, and that patented by Costanza (U.S. Pat. No. 6,594,535) in 1999, and more recently JDA Software's patents of 2009 (U.S. Pat. No. 8,989,879) and 2015 (U.S. Pat. No. 8,965,539). See also R. Suri, "QRM and POLCA: A Winning Combination for Manufacturing Enterprises in the 21$^{st}$ Century," Technical Report, Center for Quick Response Manufacturing, May 2003.

A goal of production businesses is a high return on investment. Thus, if the same throughput (return) can be achieved with a smaller investment (inventory), methods of reducing inventory for a given throughput provide businesses with a competitive advantage.

The use of Kanban scheduling was championed early by Toyota Motor Company in its high volume, low variety automobile factories. Kanban cards were assigned to batches of inventory and when consumed at a production operation, they were sent back to be replenished at an upstream operation. Using this "demand-pull" method, production at an operation would only take place with an authorizing Kanban, and this resulted in:
1. Limiting the amount of inventory in a factory to that determined by the number of Kanbans issued; and
2. Stopping manufacturing at upstream operations if production was stopped at some stage of manufacturing. This is because the Kanbans would stop flowing upstream. This synchronized production and enhanced quality, and reduced cost, because if a defect was found at one stage upstream, production would be automatically stopped until the problem was solved.

Suri recognized in his 1998 innovation that the Kanban method does not work well in high variety production environments. This is because any individual part may only be made once, or at least infrequently, and replenishment based on batches of similar units is not possible. To implement his push-pull system (POLCA), the pull-signal is based on the number of production hours that a batch of work (the Work Order, or WO) represented in its destination Work Center (WC). This normalizes all production parts based on the hours required to accomplish the work in a given WC.

POLCA has been successfully implemented and has been shown to be a solution to the high-variety production problem. This disclosure describes another approach to this problem that is based on matching the flow times of WOs to their downstream demand requirements.

SUMMARY

This section provides a general summary of the disclosure and one or more of its advantages, and is not a comprehensive disclosure of the full scope of all of the features, of all of the alternatives or embodiments or of all of the advantages.

Disclosed herein is a WO flow control system for a production facility having WCs forming alternative flow paths for WOs. The system can include a computer system configured for analyzing the WOs in the WCs of the production facility. The computer system includes a main computer and an individual computer for and operatively connected to a respective one of the WCs and also to the main computer. The analyzing includes for each WC and the separate computer connected thereto: (1) identifying in the queues of all upstream-adjacent WCs the WO that should next be authorized for production based on a priority-setting rule ("Next WO"); (2) calculating the time for the Next WO to arrive ("time-to-arrive") at the next WC and comparing the time-to-arrive to the time to process all the work ahead of the Next WO ("need-time"); and (3) authorizing work on the Next WO if the time-to-arrive is greater than or equal to the need-time. As an example, the priority-setting rule can be a First-in First-out (FIFO) rule wherein the WO that is not yet authorized, and arrived in its queue before all other unauthorized WOs in the upstream-adjacent WC queues is the Next WO. The WCs, as examples only, can be gluing, folding, sanding or painting WCs.

A production method is herein disclosed that can include identifying for a given WC of a plurality of WCs in a production facility, in the queues of all upstream-adjacent WCs the WO that is next to be authorized for production based on a priority-setting rule ("Next WO"). The method can also include calculating the time for the Next WO to arrive ("time-to-arrive") at the given WC and comparing the time-to-arrive to the time to process all the work ahead of the Next WO ("need-time"). The method can further include authorizing work on the Next WO if the time-to-arrive is greater than or equal to the need-time. The priority-setting rule can be First-in First-out (FIFO), so the WO that is not yet authorized, and arrived in its queue before all other unauthorized WOs in upstream-adjacent WC queues will be the Next WO. The time-to-arrive can include the processing time for the Next WO at its current, upstream-adjacent WC plus the travel time from that WC to the given WC.

Also disclosed herein is a production method which includes: identifying a WO in a WC that has the highest priority ("the highest-priority WO") of any WO in a queue of a WC which is upstream adjacent to a WC at issue in a production plant; determining whether the time for the oldest WO to be processed and delivered to the WC at issue ("time to arrive") is greater than or less than the time until needed ("need-time") at the WC at issue; and if the time to arrive is greater than or equal to the need-time, authorizing the highest-priority WO to be worked on by its WC.

BRIEF DESCRIPTION OF THE DRAWINGS

The drawings described herein are for illustrative purposes only of selected aspects of the present teachings and not all possible implementations, and are not intended to limit the scope of the present teachings.

FIG. 1 is a schematic of sample product workflows and WCs of a system of the present disclosure.

FIG. 3A is a chart showing examples of flow time calculations and WO authorizations (all values in hours).

FIG. 12 illustrates an 11×17 sheet having a letter and other flyer notes printed thereon at the Print WC of FIG. 2.

FIG. 13 illustrates a letter in the Fold WC.

FIG. 14 illustrates a folded letter in the Insert WC.

FIG. 15 illustrates three post cards in the Print WC.

FIG. 16 illustrates a cut, printed post card in the Score & Fold WC.

FIG. 17 illustrates a cut printed sheet in the Score and Fold WC.

FIG. 18 illustrates the sheet of FIG. 17 in the Glue WC.

FIG. 19 illustrates a printed cut sheet in the UV Coating WC.

DETAILED DESCRIPTION

I. Introduction

Figure 2:
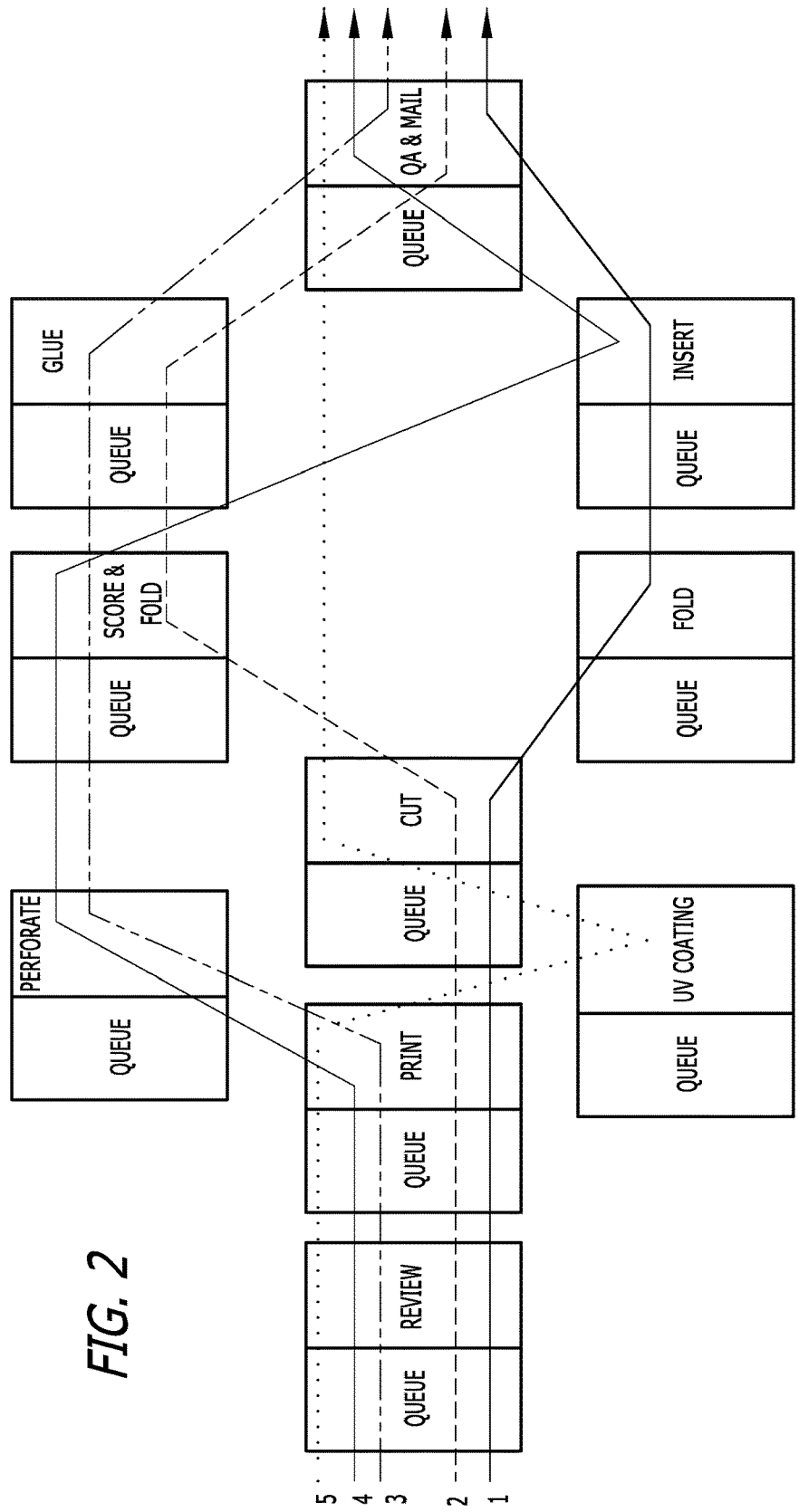
FIG. 2 is a schematic similar to that of FIG. 1 but for an exemplary print/mail shop.

The time-based demand-pull system ("demand-pull system") technology of the present disclosure provides an implementation of demand-pull scheduling for various manufacturing operations/systems/factories. It can work in conjunction with a Material Resource Planning (MRP) or Enterprise Resource Planning (ERP) system, which creates production WOs and houses associated data, such as workflows and operational standard hours, to pull work through a factory with results similar to that of POLCA. The subject demand-pull system pulls work into a downstream WC by matching the Flow Time of the WO to the Need Time of the downstream WC. Need Time is the time at which the downstream WC will be ready to process the WO, and Flow Time is the time it will take the WO to reach the downstream WC. Matching these two values results in seamless flow and reduced inventory. While this may be simple in concept, the complexity of work flow in high-variety environments and the dynamic nature of their production activities, results in overwhelming execution difficulty without the aid of computing hardware and software.

Using data from MRP that is introduced into the demand-pull system with the WOs, as well as data that is created internally, the demand-pull system is able to "reach back" for work from upstream operations and identify exactly which WO should be processed and when. It does this by creating virtual queues at each WC, identifying the optimum amount of work hours for the queues, then reaching back to identify whether authorized upstream WOs will properly replenish the queues and, if not, authorizing additional upstream WOs to be processed, if available. Matching the Flow Time of the next WO to be authorized with the Need Time of its downstream WC assures that work arrives just-in-time. The present disclosure describes this method.

II—Production Priority-Setting Examples

There are numerous methods of setting priorities in a production environment, too numerous to discuss in total in this paper, but some of the more prevalent methods are discussed below.

First-in, First-Out (FIFO)

One means of determining the priority of authorizing work in queue at a given WC is FIFO. By this method, the priority of work is determined chronologically by examining the arrival time of the WOs. The WO that arrived at the earliest time will be the next WO to be authorized for production processing.

Due-Date Slack

Another method of determining the priority of authorizing work in a queue is the difference between the time remaining until its scheduled completion date, aka due date, and the time remaining for its Flow Time through the production process. By this method, a WO that is due to complete in five days, for example, and has five days of remaining processing time would have a higher priority than a WO that is due to complete in five days and has three days of remaining processing time. The logic is that the latter WO has two additional days of slack in its production schedule, while the former WO has no slack and must be processed immediately to complete on time.

Expedite Policies

Another prioritization method is to assign a higher priority to WOs that are being expedited due to management policy. This may happen if the customer of the WO has paid an expedite fee, or the WO is a replacement for a previously delivered WO that failed quality or safety standards. Management may prioritize a customer's work for a myriad of reasons such as military materials during a time of war. By this method, the expedited WO is always authorized for production ahead of WOs that are not being expedited.

Other Priority-Setting Scenarios

There are other settings in which certain products, or customers, may have higher priority than others. These priorities may be assigned numerically to WOs, such as a 1-10 with 1 being the highest priority and 10 being lowest. In this scenario, WOs for products that are Priority-1 would receive preferential treatment and be authorized ahead of WOs with Priority-5 products.

Regardless of the system for setting priorities, for a given WC, the demand-pull system finds the highest-priority WO in its Upstream-Adjacent WCs and applies its Flow Time to Need Time comparison method to determine whether to authorize the WO for production.

III. FAFP Work Flow

When looking at work flow through a factory from the perspective of minimizing cycle time and honoring demand-pull policies, work should be processed on a first authorized, first processed (FAFP) basis. Deviating from this policy can result in an increase in the average cycle time, unless batching of WOs will reduce their aggregate cycle times due to machine capacity. For an example of the latter situation, a machine may be capable of simultaneously processing ten pieces, and if there are two five-piece (or fewer) WOs, they could both be processed at the same time to reduce their aggregate cycle time, improve efficiency and maximize capacity.

More common examples of "jumping the queue" include changing priorities at the WC due to material shortages and preferential treatment of WOs to accommodate customer requests, management priorities or operator training. But because some WOs will spend more time in queue than they otherwise would, processing work out of chronological order is not optimal and can be counter-productive. Although the WOs that jump the queue will spend less time in queue than they otherwise would, the additional non-value-added time spent prioritizing each WO, in addition to the added time spent in the queue for WOs that are not prioritized, results in higher cycle times and more turbulent flow of the manufacturing process/operation.

Given this principle, with a pool of work to be done in a WC, it is usually desirable to work first on the WO that is first authorized, based on demand, at the WC. This would be the WO with the earliest-dated work authorization (or Pull-Tag (PT)).

To enable this policy, WOs should only be started when all the requisite resources are available, that is, never started into production if a resource shortage is present. If a shortage is present, it may not be possible to process the WO with the earliest dated PT, which can cause turbulence in the production flow.

IV. Demand-Based Production from a Flow-Time Versus Need-Time Perspective

From a flow-time perspective, WOs arrive in a WC's queue at precisely the time when they are needed to be worked on. This minimizes both production cycle-time and inventory investment. The desired time for the next WO to arrive for processing is when the currently-authorized work in a WC and its upstream-adjacent (UA) WCs has been started into the WC. This assumes that demand exists for the WO at the next downstream work cell.

Figure 3:
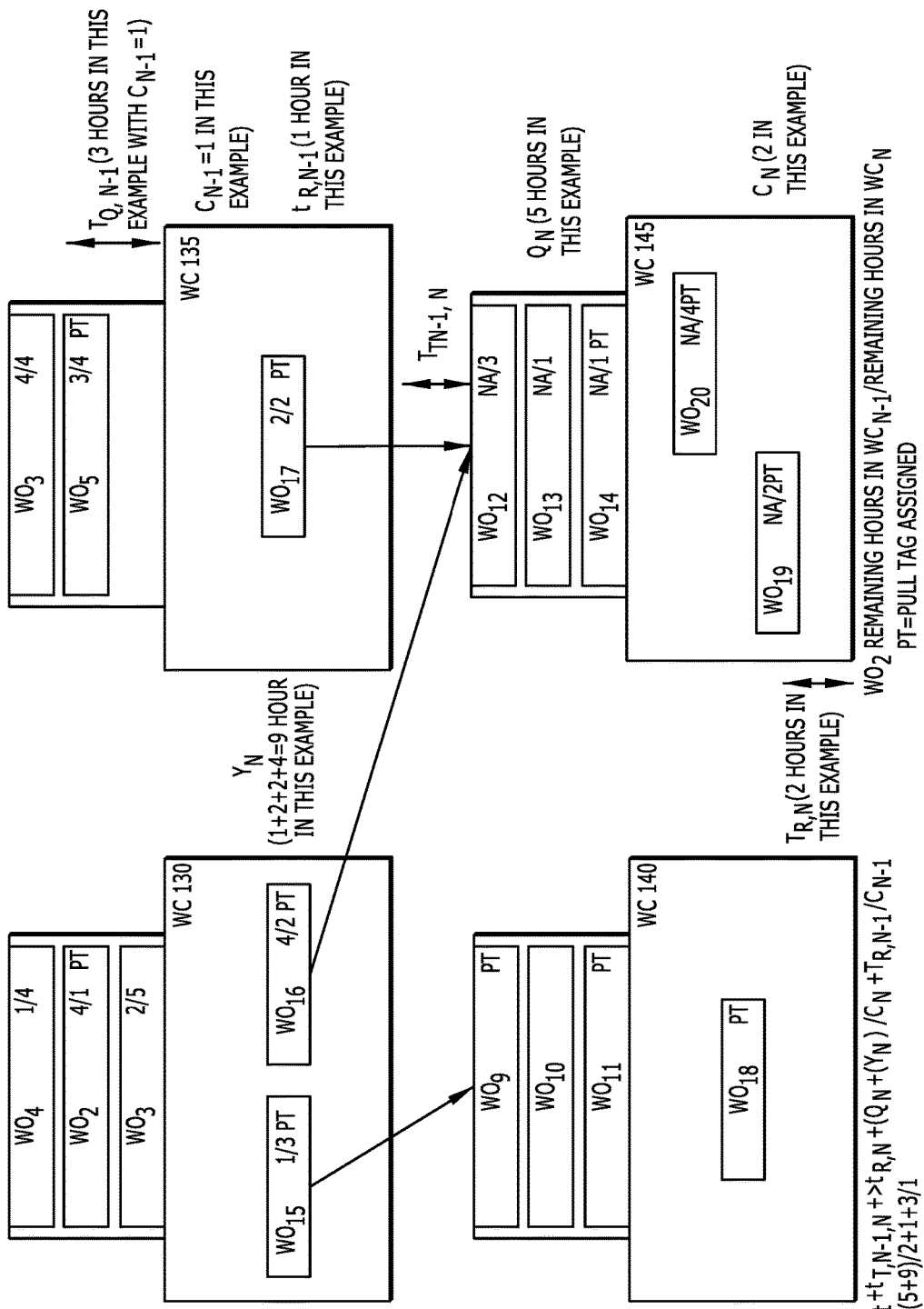
FIG. 3 is a diagram of a demand-pull workflow of the schematic of FIG. 1.

In FIG. 3, for example, WCs #130 and #135 would both be considered UA for WC #145 (refer to this destination WC as $WC_N$), since work from both of these WCs flows into WC #145. In this construct, $WO_1$ can be considered to be a WO that has not yet been authorized (assigned a Pull-Tag) for processing in its WC (WC #135), and that has the highest priority of any WOs in any WCs that are UA to WC #145. In this case, since $WO_1$ is in WC #135, WC #135 can be referred to as $WC_{N-1}$. The processing Flow Time, the elapsed time necessary to complete processing, for $WO_1$ in $WC_{N-1}$ plus its transit time from $WC_{N-1}$ to $WC_N$ should be equal to, and certainly not greater than the time required to completely flush the WOs ahead of it through $WC_N$'s queue and first operation. That is the time that $WC_N$ will be ready to begin processing it.

This timing can be modeled as shown in FIG. 3. $WO_1$ can be assigned a PT when the sum of the Flow Time of $WO_1$ in $WC_{N-1}$ ($t_{WO1, N-1}$) plus its transit time from $WC_{N-1}$ to $WC_N$ ($t_{T,N-1,N}$) [this is the time it takes $WO_1$ to arrive at the $WC_N$ queue, once it is started into $WC_{N-1}$] is equal to or greater than the remaining Flow Time of all the previously-authorized WOs ahead of it and destined for $WC_N$ or already in the $WC_N$ queue.

This time can be modeled as the time to process the WO with the least remaining Flow Time in $WC_N$'s first operation ($t_{R,N}$) [this is the elapsed time until the next production start will take place at $WC_N$, thus pulling the next WO from the $WC_N$ queue] plus ((the sum of the $WC_N$ Flow Times of WOs in the $WC_N$ queue ($Q_N$) and the sum of the $WC_N$ Flow Times for all UA WOs already authorized ($Y_N$)), divided by the number of capacity units at $WC_N$ ($C_N$) [this is the time it will take to process all upstream and queued WOs through $WC_N$, accounting for the fact that some WCs may have the capacity to simultaneously work on multiple WOs and neglecting the transit time between cell pairs]), plus the remaining Flow Time at the WC in which $WO_1$ resides for the WO with the least remaining Flow Time of all WOs that are in the $WC_{N-1}$ first operation ($t_{R,N-1}$) [this is the time it will take for the first, currently in-process, UA WO to complete processing at $WC_{N-1}$'s first operation and trigger the start of the next WO into $WC_{N-1}$], plus the quotient of the authorized $WC_{N-1}$ queue Flow Times ($t_{Q,N-1}$) and the number of capacity units in $WC_{N-1}$ ($C_{N-1}$)) [this is the time required to process all the currently-authorized $WC_{N-1}$ queue through $WC_{N-1}$'s first operation and thus the time at which $WO_1$ would be started into the $WC_{N-1}$ WIP area].

Or, when:

$$t_{WO1,N-1} + t_{T,N-1,N} \geq t_{R,N} + \frac{Q_N + Y_N}{C_N} + t_{R,N-1} + \frac{t_{Q,N-1}}{C_{N-1}} \quad\quad 1.$$

Where all variables are specified in the Section IX Table of Definitions.

Multiplying through by $C_N$ and rearranging to simplify:

$$Q_N + Y_N \leq C_N * \left( t_{WO1,N-1} + t_{T,N-1,N} - t_{R,N} - t_{R,N-1} - \frac{t_{Q,N-1}}{c_{N-1}} \right) \quad\quad 2.$$

When this equality is true, then the next WO ($WO_1$) should be authorized (assigned a Pull-tag). This is what the demand-pull system does by continuously monitoring the state of the factory in the context of the parameters of this equation. Some of these parameters, like the Standard Process Hours that are used to determine the Flow Times that comprise $Y_N$, $Q_N$, $t_{wO1, n-1}$, and $t_{Q, N-1}$, come directly from the ERP/MRP system, while other parameters are continuously monitored/calculated by the demand-pull system to complete the algorithm and assign the Pull-Tags as appropriate for the production process.

V. Examples with Reference to FIGS. 3 and 3A

The examples set forth in the Table of FIG. 3A illustrate the WO authorization process resulting from the pull-test in different circumstances. In all the examples, a set of WCs such as shown in FIG. 3 is used. There are two WCs (WC 130 and WC 135) that feed into a third WC (WC 145) and the downstream WC (WC 145) is presumed to be healthy (reference the discussion of Section IX. Work Center Performance Testing) so that the pull-testing for this WC is active. The interrogation of its upstream WCs finds that $WO_1$ is the WO that is currently unauthorized, has the highest priority, and is therefore the candidate to be authorized. The authorization is based on whether the time for this WO to reach WC 145's queue is equal to or greater than the time required to consume the work that has already been authorized ahead of $WO_1$.

In Example 1, the authorization test is affirmative. The time required for $WO_1$ to reach WC 145's queue is its Flow Time in WC 135 (four hours) plus the transit time required to get to the next WC (ten hours). It will therefore take fourteen hours for this WO to reach WC 145 once work on it has started in its current WC, WC 135. Therefore, the question is "Are there more than fourteen hours of work for WC 145 ahead of $WO_1$?" To calculate this, the time until the next WO is started is added into WC 145 ($t_{R,N}$), two hours, plus the time to consume the authorized work ahead of $WO_1$ that is destined for WC 145 (($Q_N+Y_N$)/$C_N$), seven hours, plus the time until the next start in WC 135 ($t_{R,N-1}$), two hours, plus the time required in WC 135 to consume the work ahead of $WO_1$ in its queue ($t_{Q,N-1}/C_{N-1}$), three hours. The sum is fourteen hours, which is equal to the fourteen hours required for $WO_1$ to reach WC 145's queue and, therefore, $WO_1$ is Pull Tagged and authorized for processing.

In Example 2, the processing Flow Time for $WO_1$ in WC 135 is increased to six hours and therefore it will take an additional two hours for $WO_1$ to reach WC 145's queue, or sixteen hours. Since 16>14, the test is affirmative and $WO_1$ is again authorized for processing in WC 135.

In Example 3, the currently-authorized work ahead of $WO_1$, destined for WC 145 ($Y_N$), is increased to twelve hours as compared to the nine hours in Example 1. The three hours of additional work ahead of $WO_1$ means that $WO_1$ is not required in the time it will take to arrive and results in the authorization test failing; that is, $WO_1$ is not authorized for processing.

In Example 4, the transit time between WC 135 and WC 145 is reduced from ten hours to one hour. This means that $WO_1$ will arrive nine hours sooner than it would have in Example 1 and the authorization test fails to authorize $WO_1$ in this case. It fails because, if authorized, it would arrive sooner than it is needed.

VI. Calculating Flow Time in a Work Center

Using Standard Labor/Machine Processing Hours:

In the case where all units in a WO are processed as a discrete set, the Flow Time of a WP in a WC is equal to the Standard Process Hours of the WO.

Adjusting for Serial Lot-Splitting

Figure 4:
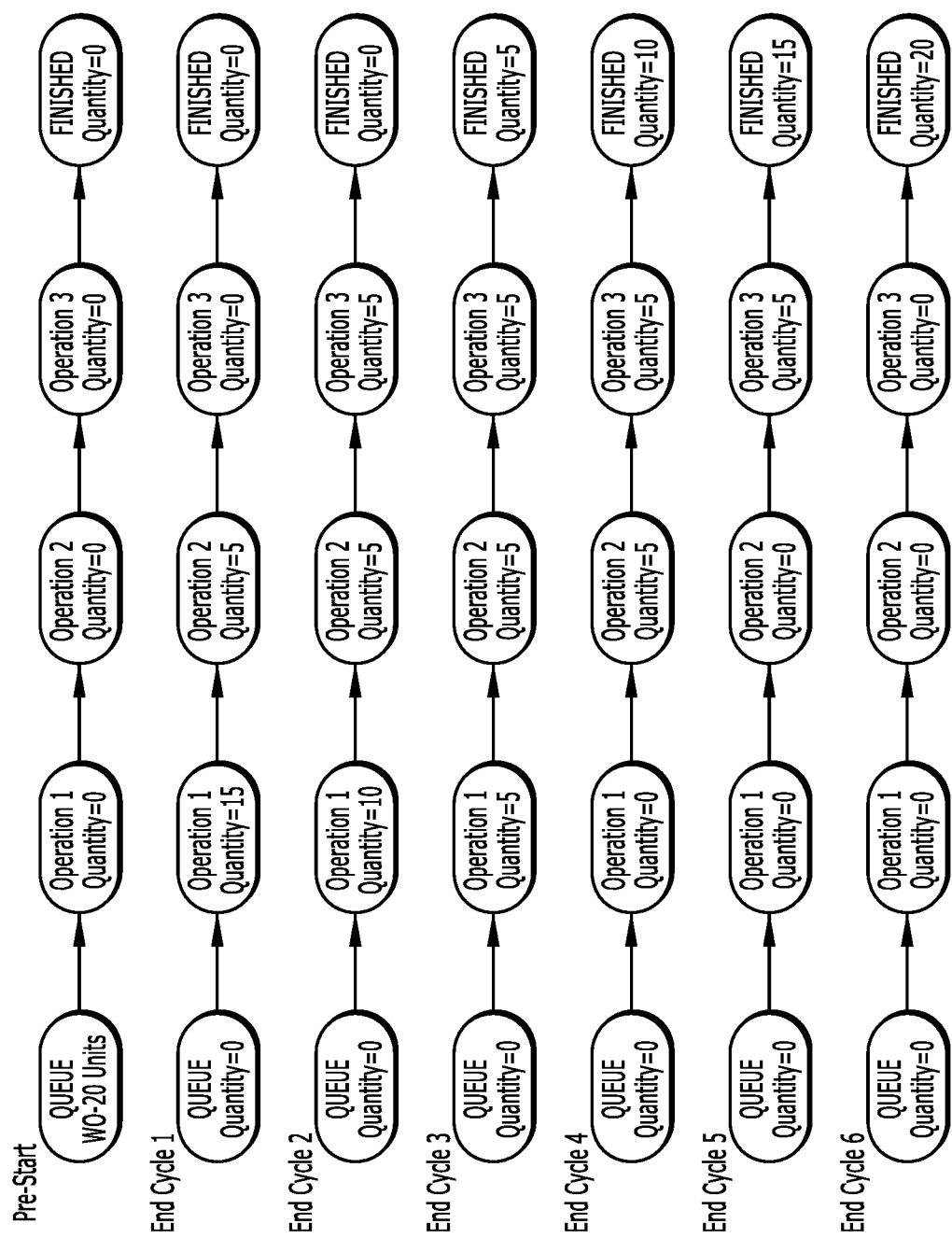
FIG. 4 is a WO depiction which includes serial lot-splitting.

In the case where there are multiple, and serial, operations within the WC and the WO is split into multiple batches within the operations, the Standard Process Hours is adjusted to reflect the actual Flow Time. The situation is illustrated in FIG. 4 for a WO of twenty units with three serial operations within the WC and a batch size of five.

For example, a WO with a Standard Hour per Unit (HPU) of one-hour per operation, or three hours total. The total Standard Hours for this WO is then sixty hours and, if worked on at a single operation, or even moved from operation-to-operation as a single batch, the Flow Time would indeed be sixty hours. But when the WO is split into smaller batches, and moved from operation-to-operation as each batch is completed, the simultaneity of work activities will tend to compress the Flow Time. In the example shown above, each batch would move every five hours, the operation cycle-time or takt time, and the WO would complete queue-to-finished after six cycles, or just thirty hours, 50% of the Standard Hours. Thus, this Flow Time compression effect should be taken into account in the case of sequential batch-processing.

The Flow Time of a WO at a WC is an essential component in this disclosure and is embodied in the previously defined variables $t_{WO1,n-1}$, $t_{R,N}$, $Q_N$, $Y_N$, $t_{R,N-1}$, and $t_{Q,N-1}$. To account for the serial-lot-split case illustrated above, an adjustment to convert Standard Hours to Flow Time is applied to these factors on a WO-WC basis.

In particular, an adjustment is made and it should take the form of a ratio that can be applied to the Standard Process Hours:

$$R = \frac{WO_{FT}}{WO_{SH}} = \frac{\text{Flow Time}}{\text{Standard Process Hours}} \quad 3.$$

This ratio will vary at each WC and for each WO based on batch sizes and numbers of operations and is derived as follows:

The batch size that is processed through the WC for a WO is the quantity of units within the WO divided by the number of batches into which the WO is to be split, $B_N$.

$$B = \frac{\text{\# Units}}{B_N} \quad 4.$$

In a balanced line, the operation cycle-time for each batch is equal, or nearly equal, for all operations and is the HPU for the WO divided by the number of operations, $O_N$, (to give HPU per operation) multiplied by the batch size. Expressing this in terms of a single batch gives:

$$O_{HPB} = \frac{HPU}{O_N} * B \quad 5.$$

The Flow Time, $WO_{FT}$, is the amount of elapsed time between the first Batch starting at the first operation and the last Batch finishing at the last operation. This can be broken up into two segments. The first segment is the amount of time that it takes to complete all batches through the first operation, which is the "Clear Time". The second segment is the amount of time it takes to complete all batches through the rest of the operations, which is the "Flush Time." Flow Time is the sum of these two times:

$$\text{Flow Time} = \text{Clear Time} + \text{Flush Time} \quad 6.$$

Clear Time can be computed as the number of Batches times the $O_{HPB}$.

$$\text{Clear Time} = t_C = (B_N * O_{HPB}) \quad 7.$$

Or $$\text{Clear Time} = t_C = \left(\frac{\text{\# Units}}{B} * O_{HPB}\right) \quad 8.$$

Alternatively, this variation is used to calculate $Q_N$, $t_{R,N}$, and $t_{R,N-1}$ in the pull-test algorithm, by substituting equation 3 for the value of $O_{HPB}$, and Clear Time can be expressed as:

$$\text{Clear Time} = t_C = \left(\frac{HPU * \text{\# Units}}{O_N}\right) \quad 9.$$

The Flush Time is the time required for the last Batch to get though the rest of the Operations, not counting the first one since it was counted in the Clear Time, or $$\text{Flush Time} = t_F = (O_N - 1) * O_{HPB} \quad 10.$$

Adding the two segments together yields the following:

$$\text{Flow Time} = WO_{FT} = \left(\frac{\text{\# Units}}{B} + O_N - 1\right) * O_{HPB} \quad 11.$$

The denominator of the ratio, R from equation 1, Total Standard Hours ($WO_{SH}$), will equal the sum of the amount of time that each batch spends at each operation. This can be expressed as a simple multiplication of the number of batches by the number of Operations and by the Operational hours per batch.

$$WO_{SH} = B_N * O_N * O_{HPB} \qquad 12.$$

Or $$WO_{SH} = \frac{\text{\# Units}}{B} * O_N * O_{HPB} \qquad 13.$$

Now that both the Total Standard Hours and Flow Time are represented in terms of Quantity, Number of Operations, and Batch Size the ratio between the two values can be calculated. This ratio is the conversion factor for converting Standard Hours into Flow time from equation 3:

$$R = \frac{WO_{FT}}{WO_{SH}}$$

Substituting the results from equations 11 and 13 into equation 3:

$$R = \frac{\left(\frac{WO_Q}{B} + O_N - 1\right) * O_{HPB}}{\frac{WO_Q}{B} * O_N * O_{HPB}} \qquad 14.$$

$$R = \frac{\left(\frac{WO_Q}{B} + O_N - 1\right)}{\frac{WO_Q}{B} * O_N} \qquad 15.$$

$$R = \left(\frac{WO_Q}{B} + O_N - 1\right) * \left(\frac{B}{O_N * WO_Q}\right) \qquad 16.$$

$$\boxed{R = \frac{WO_Q + (B * O_N) - B}{O_N * WO_Q}} \qquad 17.$$

Example

An example follows:

\#Units=20; $O_N$=3; $B$=5; HPU=3

Using equation 2, these values yield four for the number of batches that will flow through the WC:

$$B_N = \frac{\text{\# Units}}{B} = \frac{20}{5} = 4$$

Using equation 10, this gives a value of Total Standard Hours of sixty:

$$WO_{SH} = O_N * B_N * O_{HPB} = 3*4*5 = 60$$

The Flow Time, equation 9, has a result of thirty:

$$WO_{FT} = (B_N + O_N - 1) * 5 = (4+3-1)*5 = 30$$

The Ratio R, equation 1, has a value of 0.5:

$$R = \frac{WO_Q + (B*O_N) - B}{O_N * WO_Q} = \frac{20 + (5*3) - 5}{3*20} = 0.5$$

A simplistic visualization of the flow of batches through a WC on the right plots Operations on the horizontal with time on the vertical. The numbers symbolize the Batch number and their flow within the WC. The boxes symbolize all of the Standard Hours. Notice that if all the columns are shifted up to form a rectangle the Total Standard Hours formula becomes a simple area calculation.

|  | Operations |  |  |
|---|---|---|---|
| Normalized Time | 1 |  |  |
|  | 2 | 1 |  |
|  | 3 | 2 | 1 |
|  | 4 | 3 | 2 |
|  |  | 4 | 3 |
|  |  |  | 4 |

The other key visualization here is the Flow Time. The height of the vertical axis is the Flow Time.

The implications for the present system are that when serial lot-splitting is operational, this calculation is done for each applicable WO and WC, and the values of $t_{WO1, n-1}$, $t_{R,N}$, $Q_N$, $Y_N$, $t_{R,N-1}$, and $t_{Q,N-1}$ are adjusted accordingly. References to Flow Time for a WO in this disclosure refer to:

$$((HPU_N * \text{\#Units}) * R) \qquad 18.$$

Adjusting for Parallel Lot-Splitting

When $C_N$ or $C_{N-1}$ is greater than 0, WOs may be split and run through multiple paths in the WC. This causes Flow Time to contract depending on the number of paths through which the WO is processed. When a lot is split when started, the present system first checks to validate the number of paths through which it is split versus the value of C in the WC, and then adjusts the Flow Time based on the ratio of the largest quantity sub-lot versus the # Units in the WO, $R_C$.

$$R_C = \frac{\text{\# Units in largest sublot}}{\text{\# Units}} \qquad 19.$$

In this case, R can be further generalized as $$R = R_C * \frac{\text{Flow Time}}{\text{Standard Process Hours}} \qquad 20.$$

Or, from equation 16:

$$\boxed{R = R_C * \frac{\text{\# Units} + (B*O_N) - B}{O_N * \text{\# Units}}} \qquad 21.$$

Other Lot-Splitting Cases

There are other variations and combinations of lot-splitting cases that will also result in deviations between Flow Time and Standard Process Hours. The derivations of these adjustments are not presented herein.

VII. Demand-Based Production from a Work-Volume Perspective

When looking at authorizing work in upstream stages of production, the traditional Kanban system establishes quantity buffers, or queues, at each WC. Then when the buffer quantity hits a minimum value (the Queue Policy), the Kanban card is returned to its originating WC for replenishment. While this unit-quantity buffer does not work well in a high-variety production environment (Suri, et al), the concept of a Queue Policy can still be a useful management tool if expressed in work-hours as opposed to unit-quantities.

Within the present demand-pull system, the concept of a manageable Queue Policy is coupled with the demand flow concept of Section VII below, to create a management framework for setting inventory levels for the queues at each WC. Disclosed herein are a WC buffer, or queue, and a "policy" that provides for adjustment of the inventory in the factory. For this reason, the WC is conceptualized as a two-part entity in FIG. 1, the Queue and the Work-in-Process (WIP) area, and a goal herein is to minimize the hours in the Queue and maximize throughput.

With FAFP processing in mind, this trigger can be expressed mathematically for any given WC "N" ($WC_N$), except the first WC in a production process, as follows:

$$W_N \leq X_N - (Q_N + Y_N) \quad 22.$$

or $$X_N \geq Q_N + Y_N + W_N \quad 23.$$

Where all variables are specified in the Section IX Table of Definitions.

When this inequality is true, a Pull-tag is assigned to $WO_1$. Or, more completely, an upstream pull-authorization will be attempted on $WO_1$ whenever the amount of work in $WC_N$'s queue plus the work upstream that has already been authorized and destined for $WC_N$ is less than the Queue Policy ($X_N$). But the pull-authorization will not be completed, and a PT assigned, unless the amount of work represented for $WC_N$ by $WO_1$ ($W_N$), when added to the current queue ($Q_N$) and currently-authorized UA WOs (either in UA queues or in UA WIP) ($Y_N$) will not exceed the Queue Policy, $X_N$.

Assigning a precise value to the Queue Policy ($X_N$) can now be accomplished within the algorithmic context of Section III set forth above.

VIII. An Optimum Queue Policy

The formulae from Sections IV and VI can now be combined to solve for the Queue Policy ($X_N$). From Section VI, equation 22:

$$Q_N + Y_N \leq X_N - W_N$$

From Section IV, equation 2:

$$Q_N + Y_N \leq C_N * (t_{WO1, n-1} + t_{T,N-1,N} - t_{R,N} - t_{R,N-1} - t_{Q,N-1} / C_{N-1})$$

Therefore $$X_N - W_N = C_N * \left( t_{WO1,N-1} + t_{T,N-1,N} - t_{R,N} - t_{R,N-1} - \frac{t_{Q,N-1}}{C_{N-1}} \right) \quad 24.$$

and the Queue Policy for $WC_N$ is given by:

$$X_N = C_N * \left( t_{WO1,N-1} + t_{T,N-1,N} - t_{R,N} - t_{R,N-1} - \frac{t_{Q,N-1}}{C_{N-1}} \right) + W_N \quad 25.$$

From Section VI, this value of $X_N$ can be used to assign a Pull Tag to $WO_1$ when the sum of its Clear Time in $WC_N$ ($W_N$)+the queued Clear Times in the $WC_N$ queue ($Q_N$)+the sum of the Clear Times at $WC_N$ for all authorized UA WOs' ($Y_N$) is less than or equal to that value of $X_N$. This formula, in the limit where all flow-times are 0, sets a "floor" of $W_N$ hours, which is needed to avoid "starving" a WC by setting a maximum Queue Policy that is less than the number of hours represented by the next WO to be authorized. All of the stated terms are "knowable" quantities within the construct of most ERP/MRP systems so that this construct is easily implementable.

The question can be raised as to why the formula from Section V is re-introduced to define a pull algorithm, or why the flow formula ($t_{WO1, n-1} + t_{T,N-1,N} \leq t_{R,N} + (Q_N + Y_N)/C_N + t_{R,N-1} + t_{Q,N-1}/C_{N-1}$) cannot just be used to assign Pull tags. The answer is primarily a matter of visual management in a lean environment. The concept of a maximum Queue Policy is a manageable and understandable concept in the factory environment and one for which the present technology provides management over-rides and/or adjustment factors to accommodate the realities of variability in the individual WCs. This pull-system conforms to the idea that when inventory falls below a pre-determined policy level, a replenishment signal is sent, yet at the same time, by using ideal flow times, it is forcing queued inventory toward zero.

IX-Table of Definitions

| # | Item Description | Variable | Formula/Explanation |
|---|---|---|---|
| 1 | Flow Time for $WO_1$ through $WC_{N-1}$ | $t_{WO1, n-1}$ | R * HPU # Units |
| 2 | Transit Time for $WO_1$ from $WC_{N-1}$ to $WC_N$ | $t_{T,N-1,N}$ | This is a constant value entered by admin staff. |
| 3 | Remaining Clear Time of the WO in process at $WC_N$ with the least remaining Clear Time. | $t_{R,N}$ | ($t_{C,N}$) − (Elapsed Processing Time) for the applicable WO |
| 4 | Sum of the Clear Times for $WC_N$ of all WO's in its queue. | $Q_N$ | $\sum_{WO=1}^{WO=n} t_{C,N}$ for all WOs in the $WC_N$ queue |

-continued

IX-Table of Definitions

| # | Item Description | Variable | Formula/Explanation |
|---|---|---|---|
| 5 | Sum of the Clear Times at $WC_N$ for all authorized UA WOs | $Y_N$ | $\sum_{WO=1}^{WO=n} t_{C,N}$ for all authorized UA WOs |
| 6 | Number of capacity units within $WC_N$ | $C_N$ | This is a constant value entered by admin staff. |
| 7 | Remaining Clear Time at $WC_{N-1}$ for the WO with the least remaining Clear Time | $t_{R,N-1}$ | $t_{C,N-1}$ − (Elapsed Processing Time) for the applicable WO |
| 8 | Sum of the Clear Times for $WC_{N-1}$ for all authorized UA WOs in the $WC_{N-1}$ queue. | $t_{Q,N-1}$ | $\sum_{WO=1}^{WO=n} t_{C,N-1}$ for all authorized UA WOs in the $WC_{N-1}$ queue |
| 9 | Number of capacity units within $WC_{N-1}$ | $C_{N-1}$ | This is a constant value entered by admin staff. |
| 10 | Batch Size | B | This is a constant value entered by admin staff. If the WO will not be serially split, the B is equal to the WO # Units. |
| 11 | Number of Operations within the WC for a given WO | $O_N$ | This is a constant value based on the WO's Work Flow, or Routing. |
| 12 | Clear Time | $t_C$ | the elapsed processing time required for a WO to complete the first operation in a WC. $\left(\dfrac{HPU * \# \text{ Units}}{O_N}\right)$ |
| 13 | Flush Time | $t_F$ | The elapsed processing time required for a WO to complete all operation subsequent to the first operation. $(O_N - 1) * O_{HPB}$ |
| 14 | Max Split Ratio | $R_C$ | $\dfrac{\# \text{ Units in largest sublot}}{\# \text{ Units}}$ |
| 15 | Flow Time Ratio | R | The ratio of Flow Time to Standard Process Hours in a balanced line. $R_C * \dfrac{\# \text{ Units} + (B * O_N) - B}{O_N * \# \text{ Units}}$ |
| 16 | Clear Time for $WC_N$ for $WO_1$. | $W_N$ | $t_{C,N,WO1}$ − the elapsed processing hours required to complete $WO_1$ from start to finish at a given WC. This is Clear Time + Flush Time. If a WC has a single operation, Flow Time is equal to Clear Time, and R = 1. |
| 17 | $WC_N$ Queue Policy | $X_N$ | $X_N = C_N * \left(t_{WO1,N-1} + t_{T,N-1,N} - t_{R,N} - t_{R,N-1} - \dfrac{t_{Q,N-1}}{C_{N-1}}\right) + W_N$ |
| 18 | WO Quantity | # Units | This is a property of the WO that is initially provided with the WO details, but may change if defects arise during production. |
| 19 | Standard Hours per Unit | HPU | This is a property of the WO that varies per WC and represents the total standard work hours per unit for the WC. |
| 20 | Operation Hours per Batch | $O_{HPB}$ | $O_{HPB} = \dfrac{HPU}{O_N} * B$ |
| 21 | WO Flow Time | $WO_{FT}$ | $WO_{FT} = \left(\dfrac{\# \text{ Units}}{B} + O_N - 1\right) * O_{HPB}$ |
| 22 | WO Standard Hours | $WO_{SH}$ | $WO_{SH} = \dfrac{\# \text{ Units}}{B} * O_N * O_{HPB}$ |
| 23 | Queued Hours | Q | Sum of Flow Times for all WOs in a WC Queue. |

IX-Table of Definitions

| # | Item Description | Variable | Formula/Explanation |
|---|---|---|---|
| 24 | UA Authorized Hours | Y | Sum of Flow Times for a WC of all WOs with open PTs at UA WCs. |
| 25 | Workflow | | refers to the sequence of defined operations required to convert raw materials into a finished unit. This is also commonly known as a routing. |
| 26 | Work Center | WC | an organization of resources that facilitates the performance of an operation or plurality of operations in a production Workflow. |
| 27 | Work Order | WO | refers to a set of similar units to be processed as a group at a WC. |
| 28 | Upstream Adjacent | UA | refers to a WC that is next prior to a given WC in a Workflow, i.e, WCN-1 would be UA to WCN. |
| 29 | Pull-Tag | PT | is a work authorization property assigned to a WO. Work may be performed on a WO if, and only if, a PT has been assigned to it and the PT is in an Open state. |
| 30 | Work Order One | $WO_1$ | the WO that is UA, has been assigned the highest priority relative to other UA WOs, and not yet assigned a PT. |
| 31 | Work Center N-1 | $WC_{N-1}$ | the WC in which WO1 is queued. |
| 32 | Balanced Line | | a sequence of processing operations, each of which requires the same time to complete. |

X. An Automated Demand-Pull System Embodiment

Figure 5:
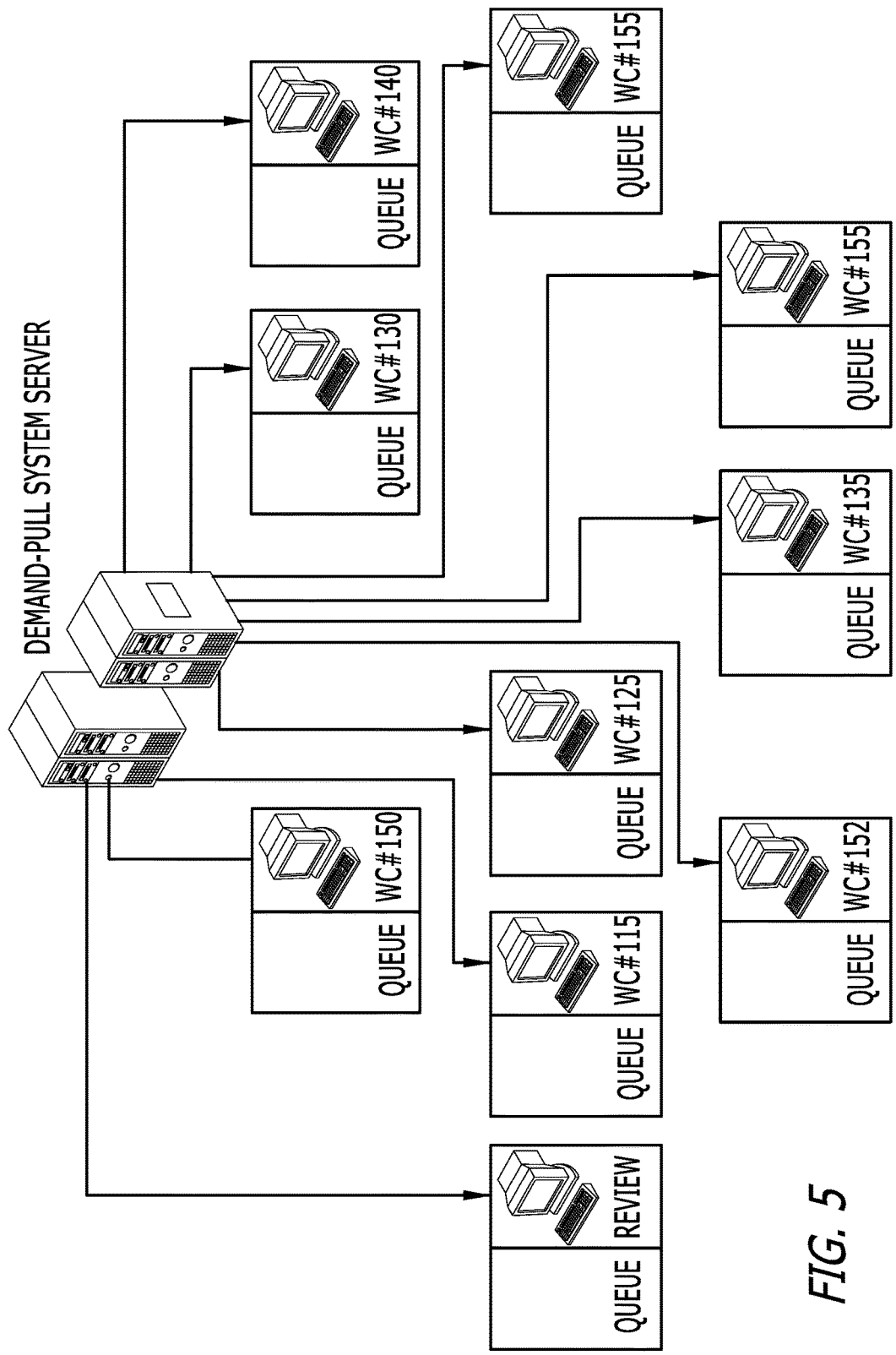
FIG. 5 is a schematic of an exemplary system architecture of the schematic of FIG. 1.
Figure 6:
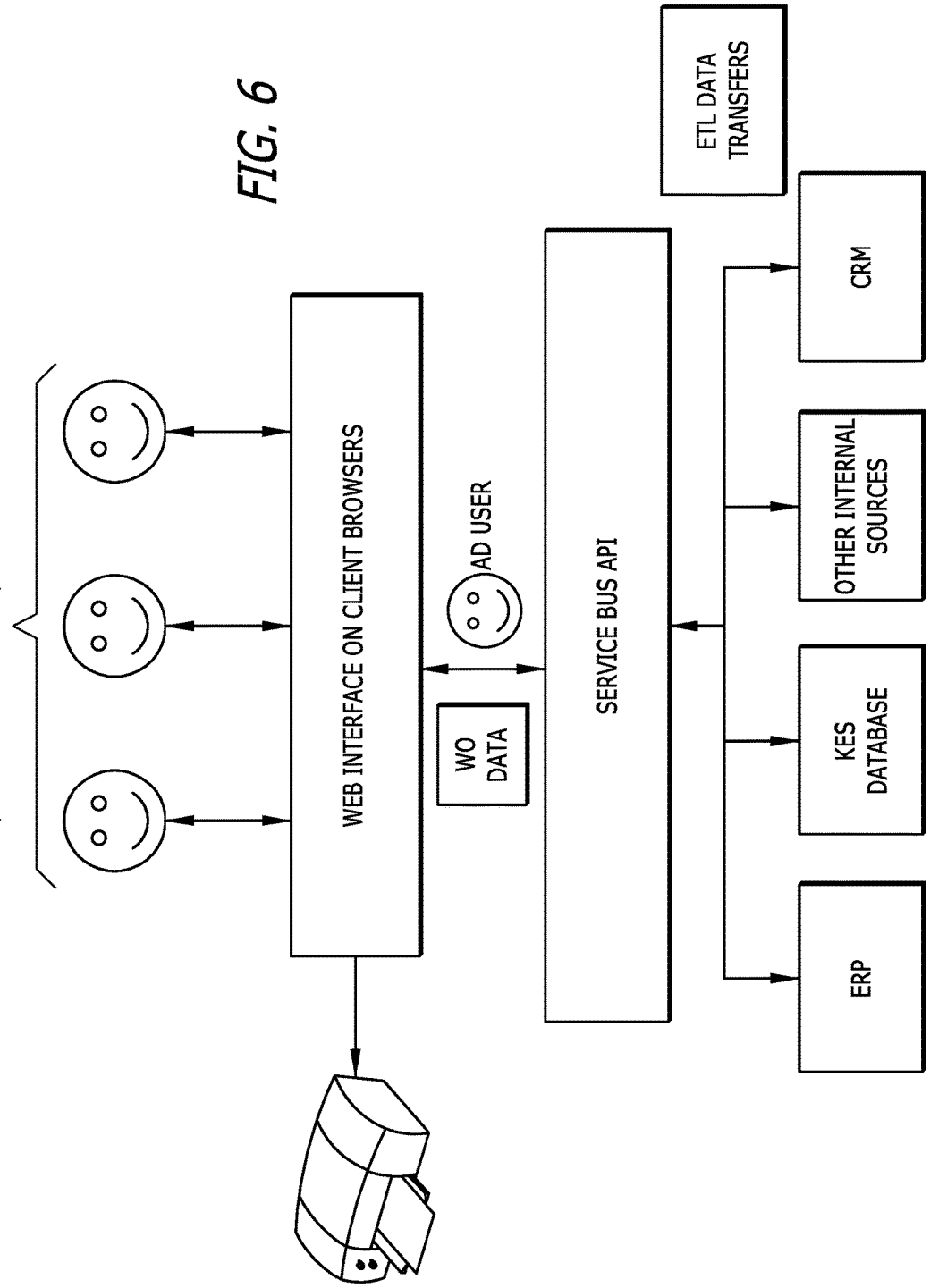
FIG. 6 is a block diagram of an exemplary system architecture of the present disclosure.

FIGS. 5 and 6 illustrate an embodiment of the demand-pull system of the present disclosure and which can be implemented using a software system with a database. In this embodiment, a .NET service bus and MSSQL database running on a networked Microsoft Windows server are connected via the local area network (LAN) to individual clients in the various WCs. These clients contain the browser-based AngularJS user interface and connect with the service bus through its Application Programming Interface (API).

Likewise, other enterprise-level software applications (ERP, CRM and so forth) interface with the software implementation and can inject new WOs and extract data on those WOs as they flow through the factory. The demand-pull system can include an Enterprise Resource Planning (ERP), Materials Resource Planning (MRP) or other similar system that creates WOs for parts to be produced by the factory. This system should also be capable of storing the associated operation sequence (Workflow), the WCs associated with each operation in the Workflow, standard processing hours per unit (HPU) at each operation, and quantities of units (# Units) to be produced.

WOs and their associated data (Workflows, HPU, # Units, and Batch sizes, if applicable, at a minimum) are then introduced into the demand-pull system. Initially, WOs have a Status code of "Pending" and when ready to begin production, the WOs are accepted into production through the demand-pull system user interface, which action changes the Status to "Open." When a WO is accepted, a time-stamp is created and it is "moved" to the Queue of the first operation in the Workflow. This is the beginning of the "demand-pull" production process.

When demand is detected at the next WC in the WO's Workflow, the WO is assigned a Pull Tag, which authorizes work activities at the first operation in its Workflow. This "detection" can be based on an affirmative result to the aforementioned test from Equation 2:

$$W_N <= X_N - (Q_N + Y_N)$$

Where, in this case, N is the next WC in the WO's Workflow. This test is done in the demand-pull system software through continuous polling of all WCs in the factory, as well as instantaneously any time a WO is Started or Finished at a WC. In other words, when a WO is started into production at a given WC, the system immediately "looks" upstream for a candidate WO to refill its queue. Likewise, when a WO is completed and moved to its subsequent WC's queue, a pull-test is performed both upstream and downstream to detect demand. When a pull-test is performed on a WC, a record can be logged with a time-stamp and the order of polling of the WCs can be based on this time-stamp. The WC with the oldest time-stamp can be polled first. The polling frequency is a user-defined interval in the demand-pull system.

All the parameters of the demand-pull system are tracked, or calculated (such as by the software) on each execution of the Pull-test. The relevant parameters can include:

Database Stored:
$C_N$, $t_{WO1, n-1}$, $t_{T,N-1,N}$, $C_{N-1}$, B, $O_N$
Calculated:
$X_N$, $t_{R,N}$, $t_{R,N-1}$, $t_{Q,N-1}$, $Q_N$, $Y_N$, $W_N$ In addition, some of the calculated values are based on other parameters that are system generated or stored in the database.

Specifically:

$t_{R,N}$—is the remaining Clear Time for the WO in $WC_N$ with the least Clear Time remaining and is calculated as the difference between the Clear Time for the relevant WO in $WC_N$ and the elapsed time since the WO was started. Therefore, the system captures the Elapsed Processing Time for each WO. Then:

$t_{R,N}$=Clear Time−Elapsed Processing Time

Likewise, $t_{R,N-1}$ is a similar calculation done on the WOs in $WC_{N-1}$ to determine the remaining Clear Time for the WO in $WC_{N-1}$ with the least Clear Time remaining.

$t_{Q,N-1}$ is the sum of the Clear Times for $WC_{N-1}$ for all WOs in its queue that have been assigned a PT. Since this calculation depends on the demand-pull system's ability to determine which WOs have $WC_N$ as the next WC in their Workflow, the demand-pull system stores all the operations in the WO's Workflow as well as the sequence of those operations and their associated WCs. Then it stores in its database all PTs, their associated WOs and WCs so that it can identify the WOs that are UA to $WC_N$ and that have been authorized for production in their current WC (assigned a PT).

Likewise, $Y_N$ relies on calculating its Clear Times for $WC_N$ and relies on the association of PTs. This calculation knows that:
  a. a PT has been assigned to the WO; and
  b. the next WC in the WO's Workflow is $WC_N$—so for that reason, the demand-pull system has stored all the steps in the WO's Workflow as well as the sequence of those steps.

$Q_N$ and $W_N$ are calculated on the basis of Clear Times, since no PT association is needed for these two values.

Figure 7:
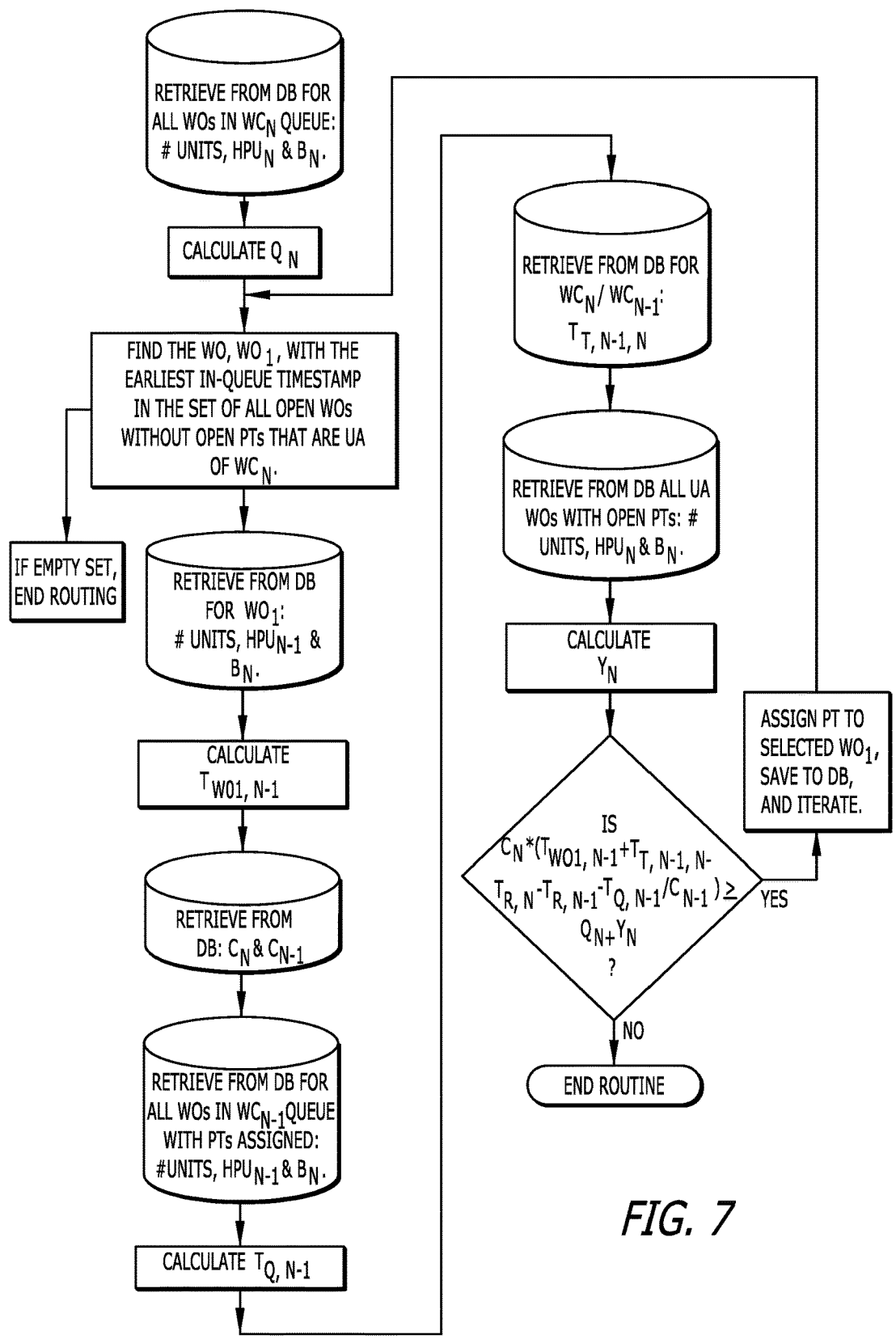
FIG. 7 is a demand-pull system logic diagram of the present disclosure with no queue management.

A flowchart of the pull-system logic of the present disclosure is shown in FIG. 7. Explanations of the terms used therein are found in the Section IX Table of Definitions.

XI. Work Center Performance Testing

When a problem reduces production rates in a WC, the WOs in its UA WCs may stall. As previously discussed, the pull-test assumes that all WOs in the $WC_N$ queue will be authorized for work prior to the arrival of $WO_1$. Because of this, all WOs, Pull-tagged (authorized) or not, are included in the pull-test that calculates the time at which $WC_N$ will be ready to consume $WO_1$. If some of this work is "stuck" and not authorized for work in a timely fashion, it can delay the arrival of $WO_1$ and "starve" the WC of work and also starve the problem WC's sibling WCs of work if they share $WC_N$ in their Workflow.

Production problems such as this can be caused by insufficient capacity, newer employees not meeting time standards, material quality or availability problems, or quality standards not being met. All these causes, and more, can affect the Flow Time and throughput of a WC. The demand-pull system must detect these problems and impose a Hold (the pull-test algorithm ignores WOs that are on Hold) on WOs in WCs that are upstream of the problem WC so that they do not throttle upstream pull signals and thereby starve their sibling WCs.

An indication of a problem in a WC is the consistent inability to meet the work standards (Standard Process Hours). Each WC's performance is therefore measured at the time it is polled for pull-testing, and a performance value of standard hours versus actual hours is computed and compared to a threshold, above which triggers a Hold for all upstream WOs and notifies the WC management. Stated more specifically, prior to running the pull-test algorithm for a given WC, a WC performance check is done, whereby the sum of the actual hours for all in-process WOs in the WC is compared to the sum of the standard hours for these same WOs. If this comparison is more than a configurable percentage, a Hold is triggered for all upstream WOs that are destined for this WC and the pull-test is skipped. This process is self-correcting since in the next polling round for the WC, if the problems have cleared up, the Hold would be released and flow would begin again.

The test:
If:

$$\frac{\sum_{WO=1}^{WO=n} \text{Actual Hours Worked}}{\sum_{WO=1}^{WO=n} \text{Standard Hours}} < P$$

Then the WC is "healthy" and pull-testing is done normally. If:

$$\frac{\sum_{WO=1}^{WO=n} \text{Actual Hours Worked}}{\sum_{WO=1}^{WO=n} \text{Standard Hours}} \geq P$$

Then the WC is "un-healthy", pull-testing is suspended and all upstream WOs destined for this WC are put on Hold. Where P is a configurable system variable, e.g. 1.5 (meaning the actual hours worked for all WOs in the WC is currently 150% of the standard hours).

XII. Other System Features

When demand for a WO is detected by the system, a PT is created in the database and associated with the WO and the relevant WC. Once a PT is assigned to a WO, the WO can then be Started into the WC by the WC staff and the system begins to record the WO's processing time. No work activities can be Started on a WO unless it has an associated Pull-Tag.

The Pull-Tagging algorithm is executed automatically when a WO is Started or Finished at a WC. This allows PTs to be created immediately after Need Time is known to have changed rather than wait for a polling system to create the PT at a later time. The Pull-Tagging algorithm will target the specific WCs where Need Time has changed. When a WO is Started the algorithm will be executed at the WC at which the WO is started to allow UA WOs to be pulled. When a WO is Finished the algorithm will be executed at the next downstream WC for the WO to allow it to be pulled immediately if appropriate. In this way, the system instantly identifies and authorizes new incoming WOs to assure a steady flow of production.

Once the work activities are completed in that WC, the WO is Finished by the WC staff, the PT is closed, and the WO is moved to queue of the next WC in its Workflow. When the WO is Finished, the staff may enter any units that were lost due to scrap or yield loss along with the predefined scrap codes that provide information on the cause for the losses. Each "pull" of a WO creates a unique PT, which is opened for the duration of the activity in that WC, then closed when the WO is moved to the next WC's queue. The PT information is then retained in the database for reporting purposes.

These calculations also require that the system track the current number of units in a WO in an environment where units may be lost to scrap, yield loss or other reasons during the production process. The demand-pull system also accounts for losses during production. The reasons for the losses are also captured in the database for management and quality control purposes.

Figure 8:
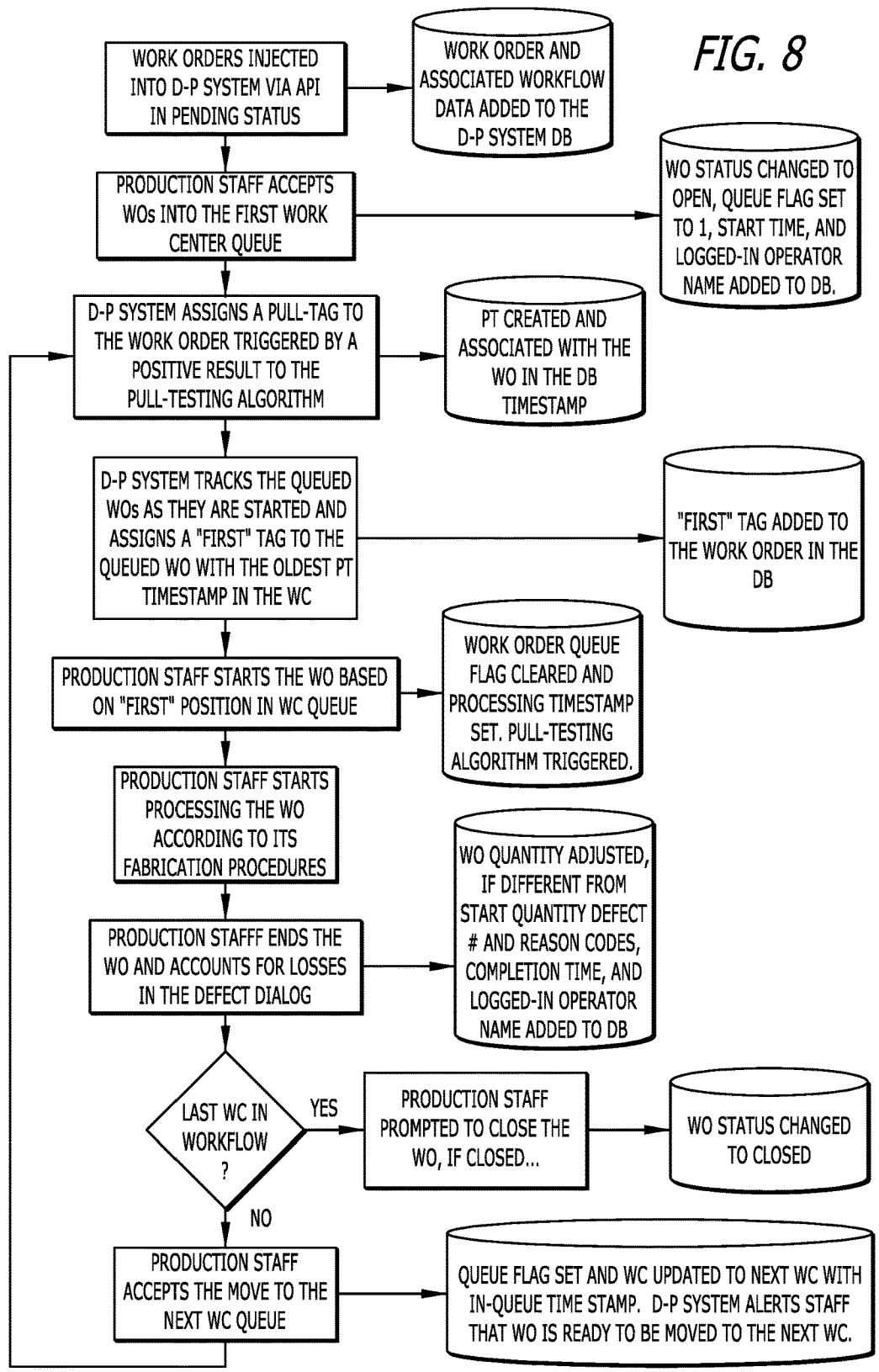
FIG. 8 is a system diagram and flow chart of business processes of the present disclosure.

FIG. 8 is a flowchart describing the operation of the demand-pull execution system.

Figure 9:
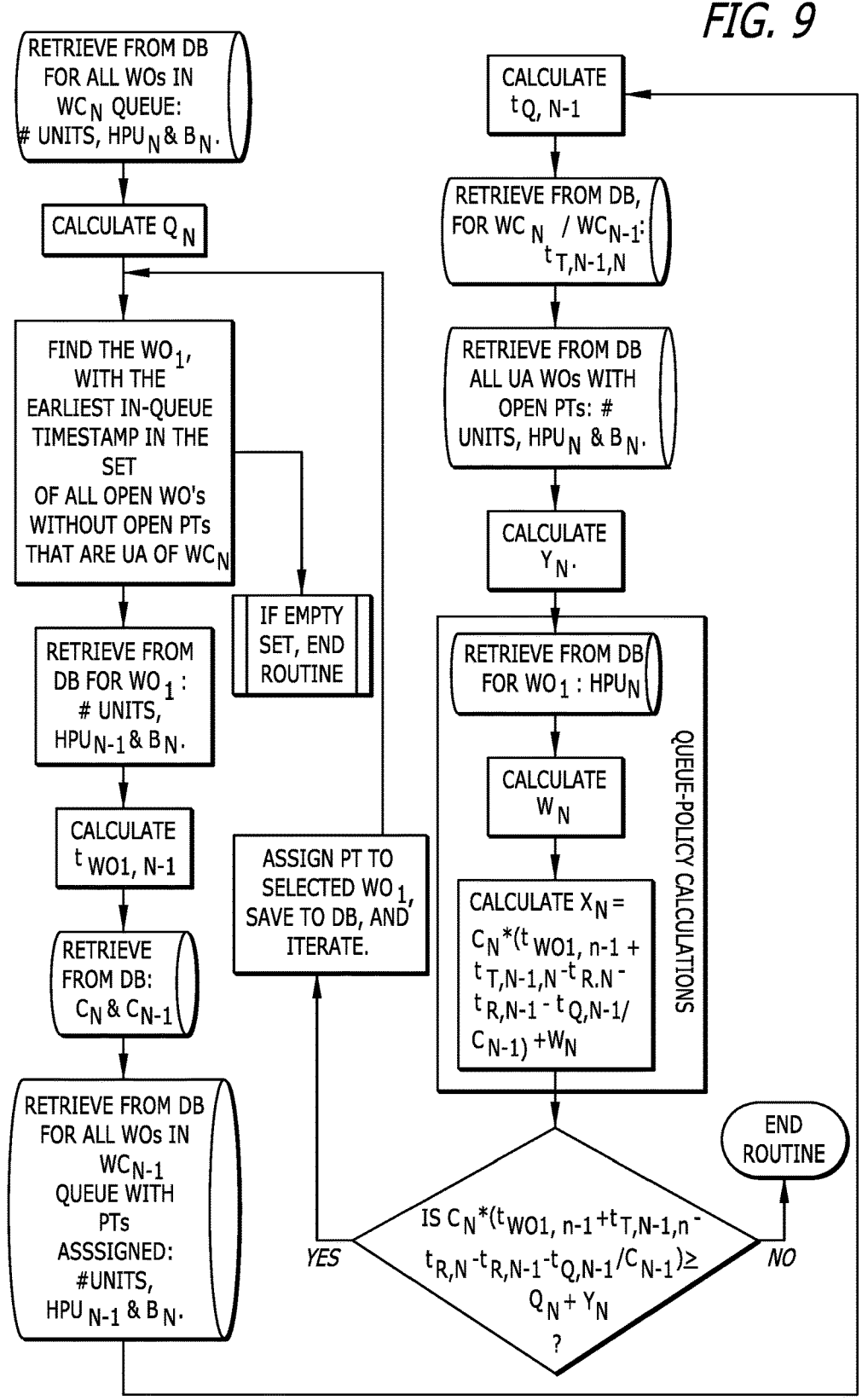
FIG. 9 is a demand-pull test logic flow chart with queue policy management (for better visual management in the factory) of the present disclosure.

Software of the present demand-pull system can have an open API, so all data associated with WOs, including its status, quantity, and location, can be interrogated by external systems at any time through an API call. The demand-pull system can also have a series of built-in metrics for management oversight, two of which are shown in FIG. 8 and FIG. 9, and a simple Javascript framework (angular-charts.js) for creating new metrics.

That is, FIG. 7 is a logic flow chart of a software embodiment of the present disclosure without a Queue Management feature. FIG. 8 is a work-flow diagram depicting the activities in a typical factory environment and the resulting actions in the D-P System software. And FIG. 9 is a logic flow chart of the software embodiment with a Queue Management feature.

Figure 10:
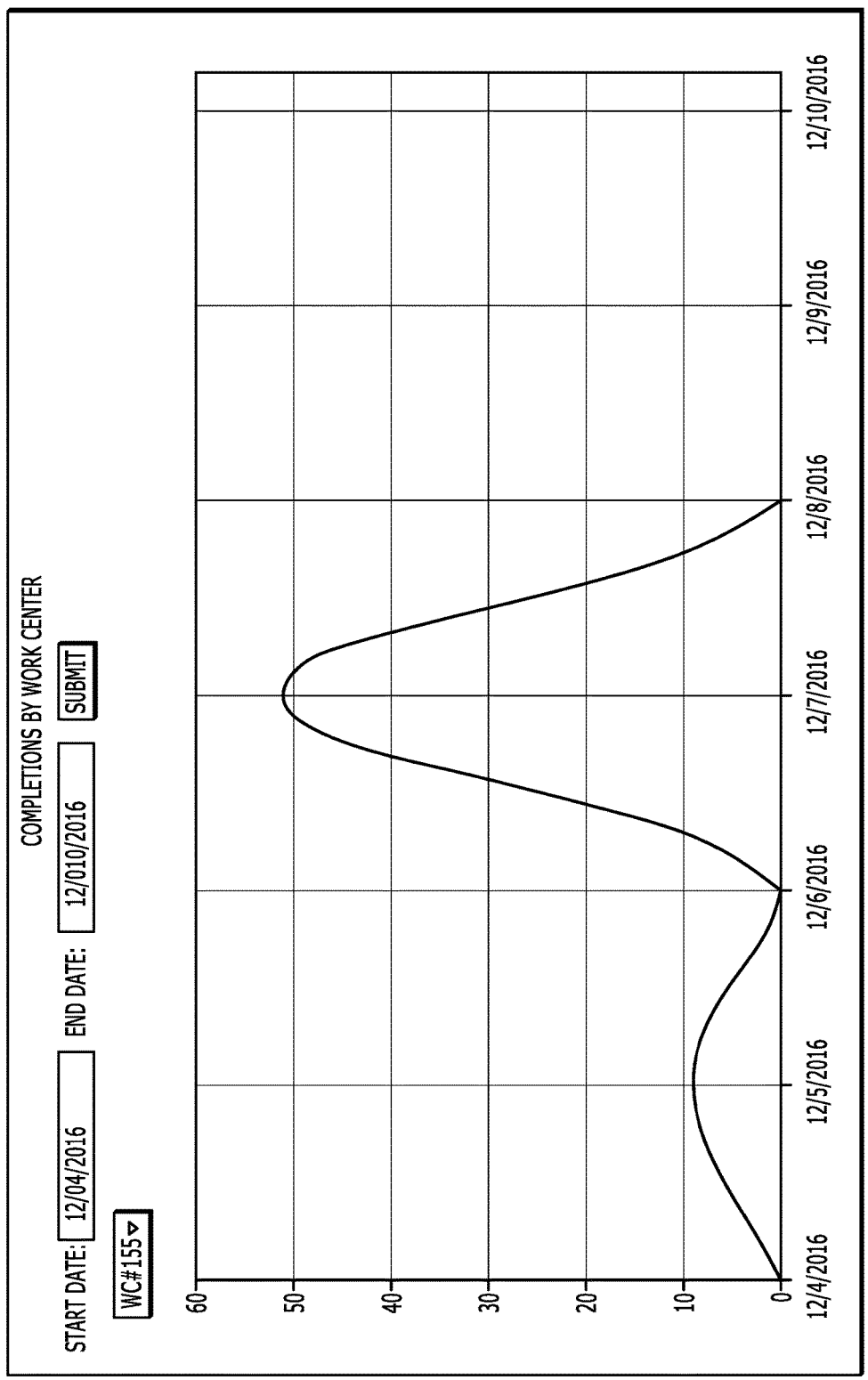
FIG. 10 is an exemplary graph illustrating completions by WC of FIG.

FIG. 10 is an exemplary graph illustrating completions by WC of FIG. 1.

Figure 11:
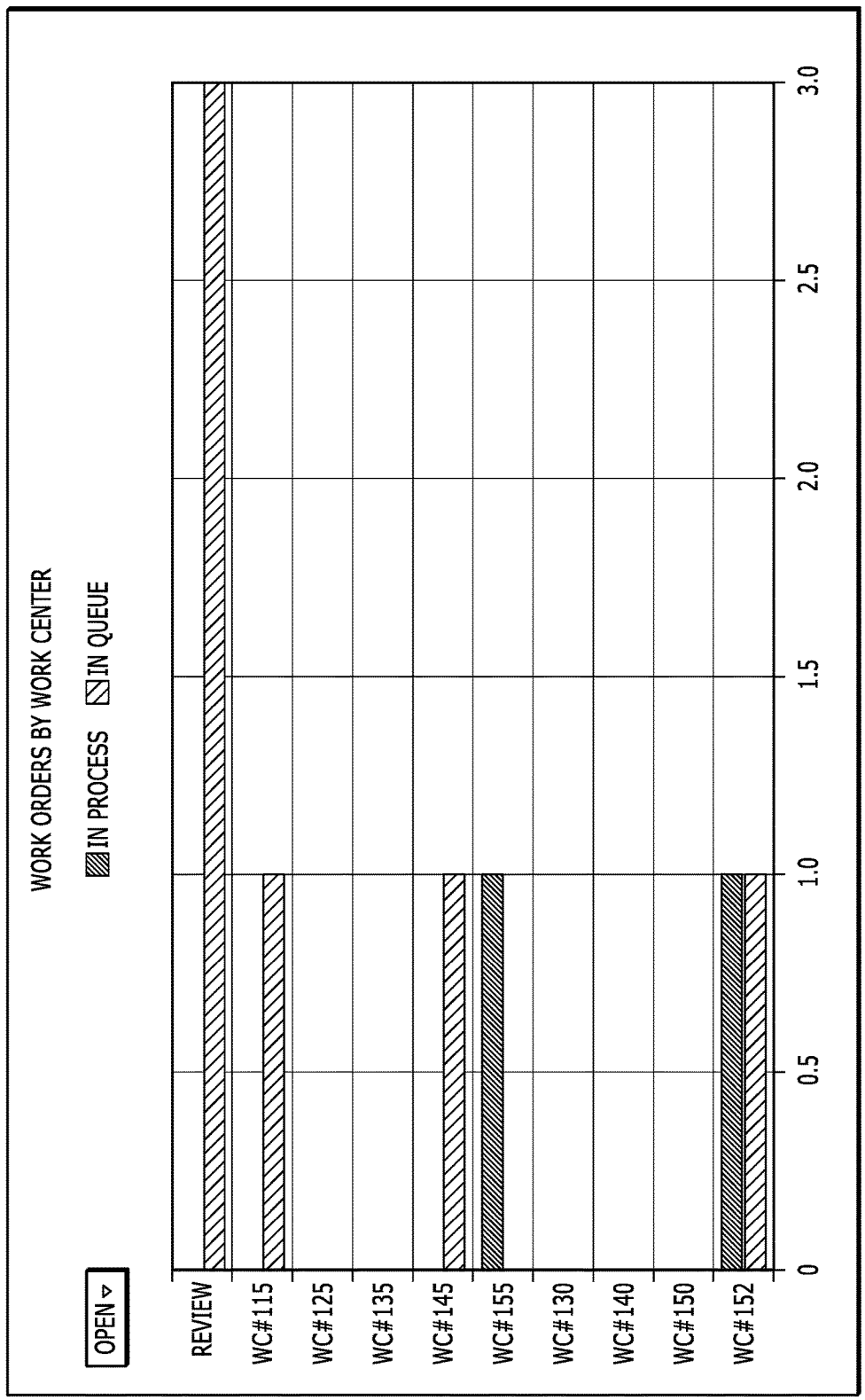
FIG. 11 is a graph illustrating cycle time and inventory of WOs by WCs of FIG. 1.

FIG. 11 is a graph illustrating cycle time and inventory of WOs by WCs of FIG. 1.

XIII. Working Example

FIGS. 12-19 illustrate work pieces at different stages of the print/mail shop (production facility) of FIG. 2 of the present disclosure.

Figure 12:
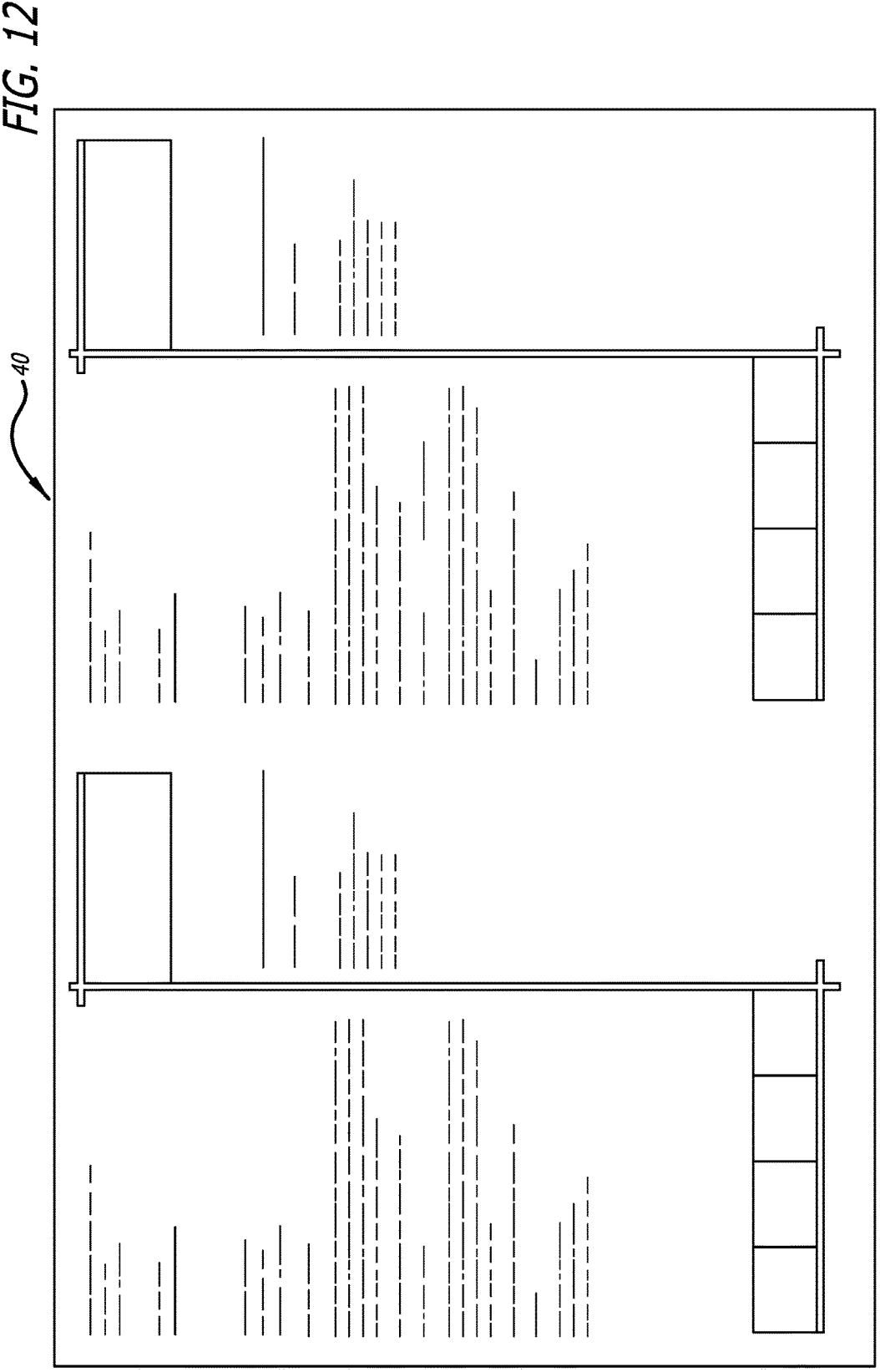
FIGS. 12-19 illustrate work pieces at different stages of the print/mail shop of FIG. 2.

FIG. 12 illustrates an 11×17 sheet 40 having a letter and other flyer notes printed thereon at the Print WC of FIG. 2.

Figure 13:
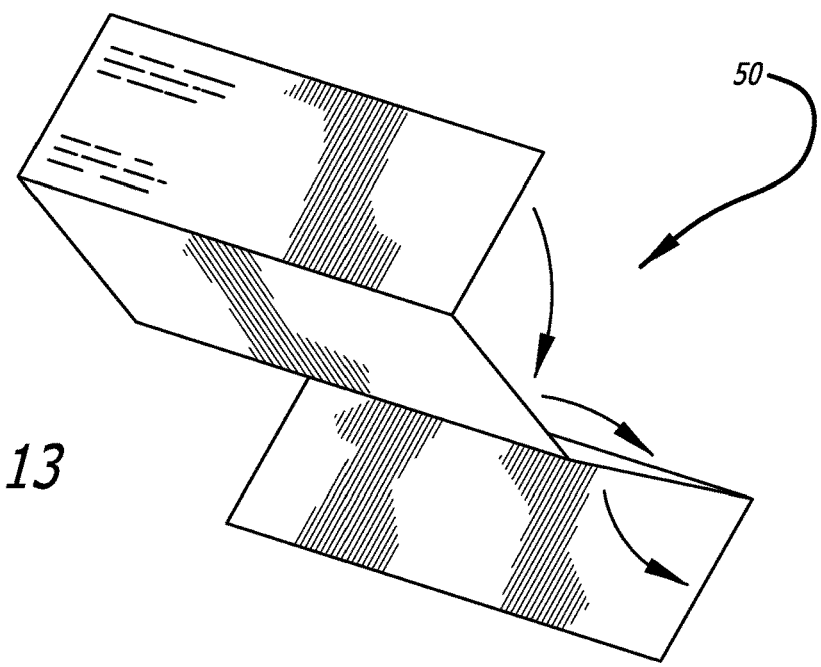

FIG. 13 illustrates a letter 50 in the Fold WC.

Figure 14:
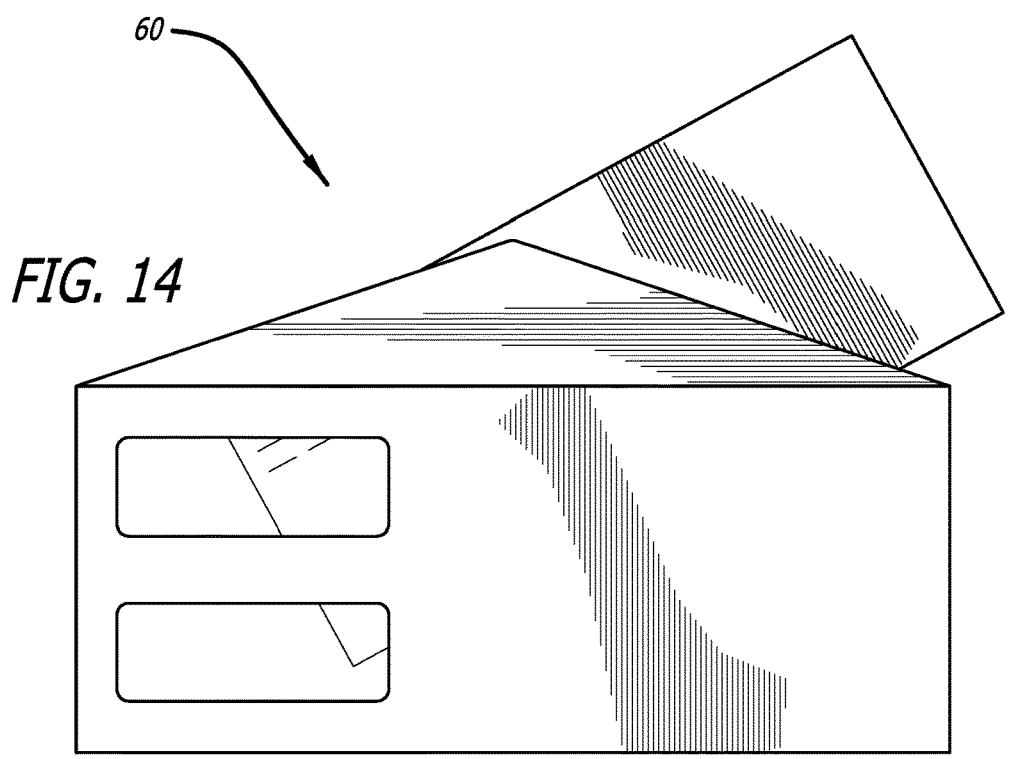

FIG. 14 illustrates a folded letter 60 in the Insert WC.

Figure 15:
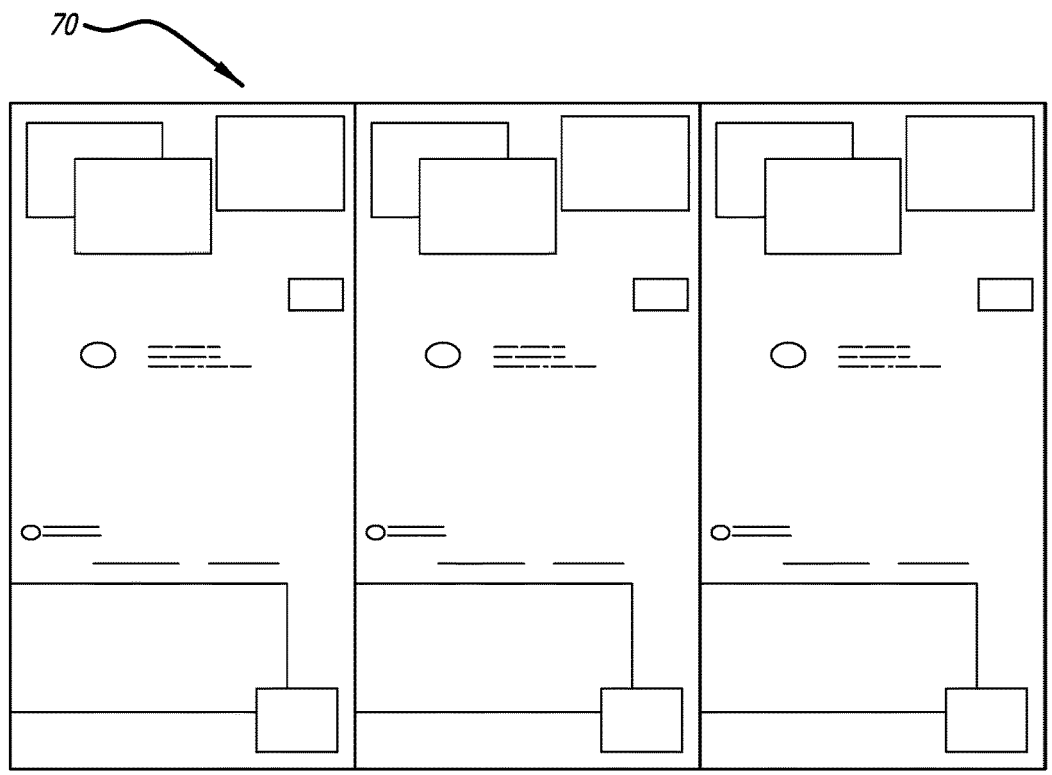

FIG. 15 illustrates three post cards 70 in the Print WC.

Figure 16:
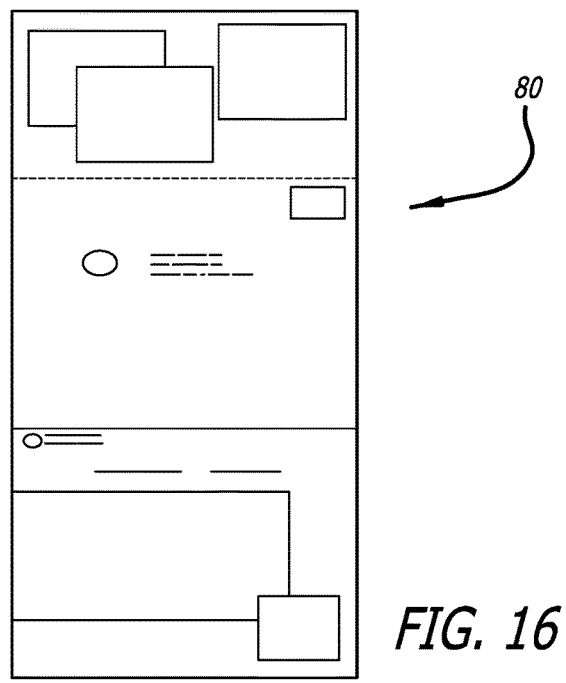

FIG. 16 illustrates a cut, printed post card 80 in the Score & Fold WC.

Figure 17:
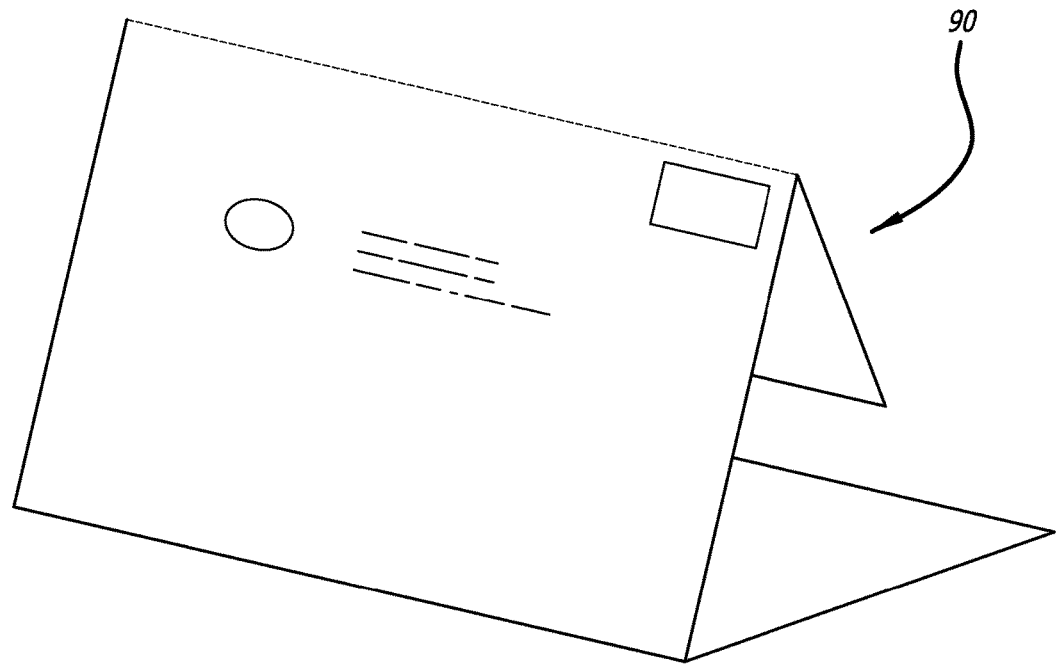

FIG. 17 illustrates a cut printed sheet 90 in the Score and Fold WC.

Figure 18:
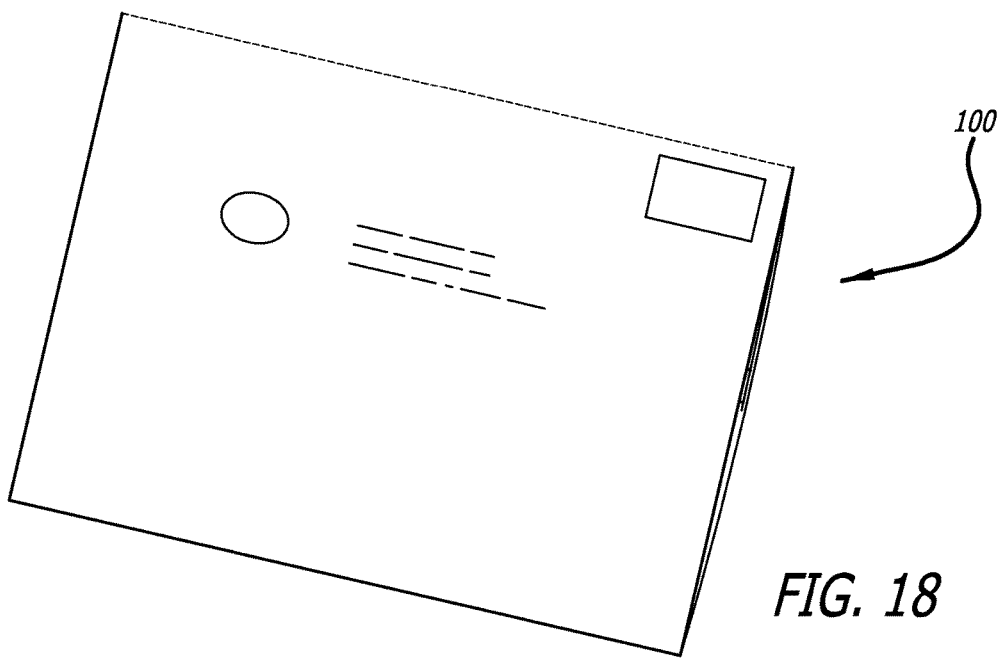

FIG. 18 illustrates the sheet 100 of FIG. 17 in the Glue WC.

Figure 19:
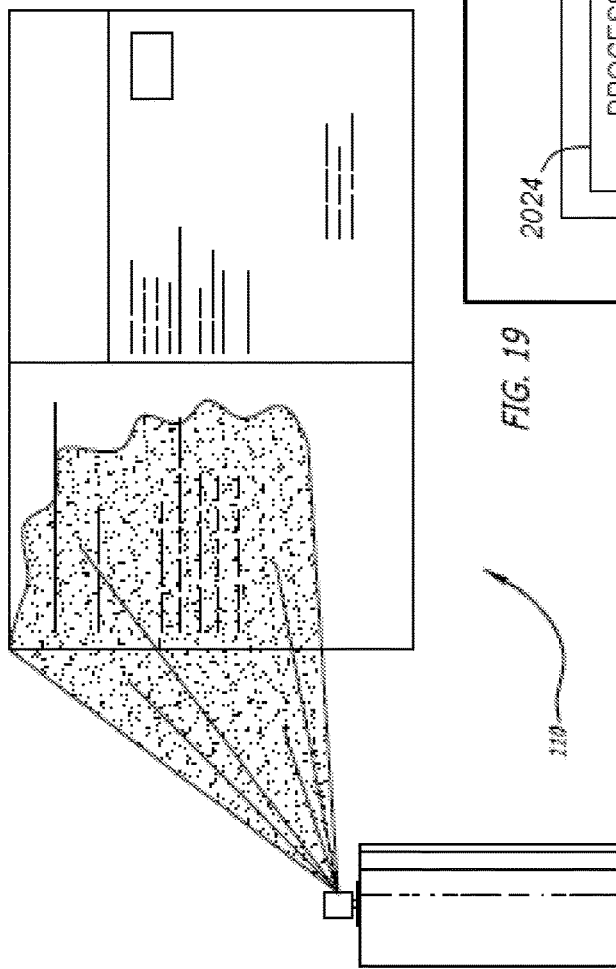

FIG. 19 illustrates a printed cut sheet 110 in the UV Coating WC.

Figure 20:
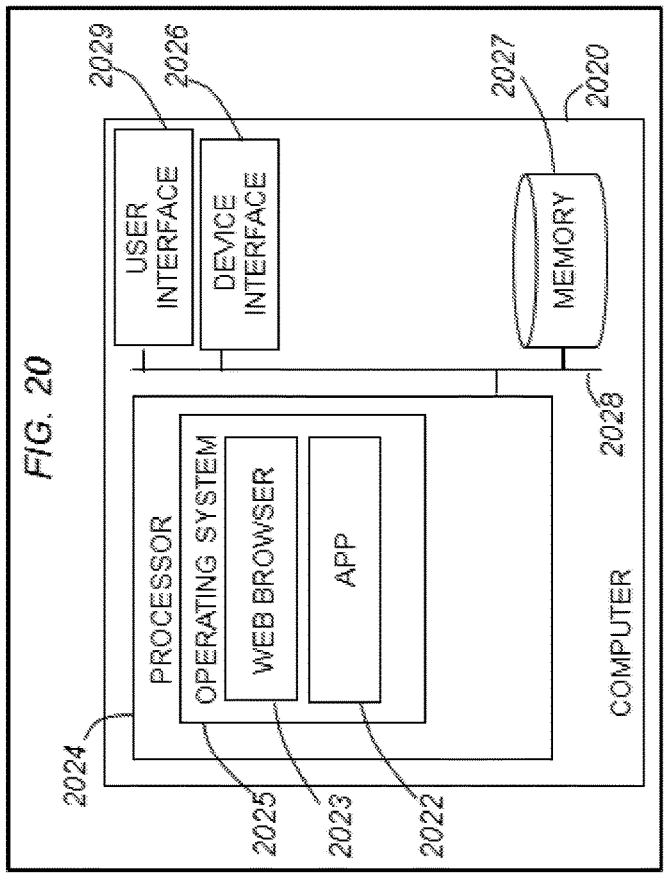
FIG. 20 illustrates an exemplary embodiment of a computing device.

FIG. 20 illustrates an exemplary top level functional block diagram of a computing device embodiment 2000. The exemplary operating environment is shown as a computing device 2020 comprising a processor 2024, such as a central processing unit (CPU), addressable memory 2027, an external device interface 2026, e.g., an optional universal serial bus port and related processing, and/or an Ethernet port and related processing, and an optional user interface 2029, e.g., an array of status lights and one or more toggle switches, and/or a display, and/or a keyboard and/or a pointer-mouse system and/or a touch screen. Optionally, the addressable memory may, for example, be: flash memory, EPROM, and/or a disk drive or other hard drive. These elements may be in communication with one another via a data bus 2028 via an operating system 2025 such as one supporting a web browser 2023 and applications 2022, the processor 2024 may be configured to execute steps of identifying, for a given WC of a plurality of WCs in a production facility, in the queues of all upstream-adjacent WCs the WO that is next to be authorized for production based on a priority-setting rule ("Next WO"); calculating the time for the Next WO to arrive ("time-to-arrive") at the given WC and comparing the time-to-arrive to the time to process all the work ahead of the Next WO ("need-time"); and authorizing work on the Next WO if the time-to-arrive is greater than or equal to the need-time.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

The visual displays in the figures are generated by modules in local applications on computing devices and/or on the system/platform, and displayed on electronic displays of computing devices for user interaction and form graphical user interface for interaction with the system/platform disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

XIV. Comparison of Time-Based Demand-Pull Versus POLCA

POLCA (Paired Overlapping Loops of Cards with Authorization) is a prior art system to produce solutions to the application addressed herein, that is, demand-based shop floor control in a high mix, or high variety, production environment. POLCA has various pre-requisites to implementation:

1. a High Level Material Requirements Planning system (HL/MRP);
2. a cellular organization;
3. cells involved in the implementation have rough-cut capacity and lead-time planning ability; and
4. the HL/MRP system (or an associated scheduling system) can produce dispatch lists.

The demand-pull system of the present disclosure advantageously does not require 3 or 4 above, Once the pre-requisites for POLCA are met, the following activities, at a minimum are required to execute the system:

1. Each pair of adjacent WCs within the production environment must be defined so that POLCA cards can be created that are unique to each WC pair. And, of course, when new WC pairings are created by new products or variations on existing products, more POLCA cards must be defined.

2. The number of POLCA cards for each WC pair must be computed based on production forecasts and WC capacity. When forecasts or capacity changes, the card numbers must be adjusted to compensate.

The present demand-pull system is rules-based: no color-coded cards, no pairing of WCs, no creating work quanta, no calculating the optimum numbers of cards, and no dispatch lists (unless an organization decides to supplement prioritization with MRP-based time). It is, therefore, simplified and optimum for a software embodiment. In addition, POLCA requires considerable ongoing maintenance as explained below.

1. Work cells must be paired based on any possible combination of production sequences, and if a new product with a different workflow is introduced, these new pairings must be added to the system, and cards generated.

2. POLCA requires that physical, multi-colored cards be created that circulate with the WOs through the production facility, and the demand-pull system of the present disclosure does not require them.

3. POLCA requires periodic examination of WC pairs, capacity, and throughput projections to regulate the numbers of POLCA cards that are allowed, so management must periodically add or remove cards based on conditions in the factory. The demand-pull system's algorithm is self-regulating and automatically adjusts the WC queue policy to compensate for changes in capacity and WIP.

4. POLCA uses MRP dispatch lists to determine which work is authorized and the sequencing of the work. This returns the system to a "quasi-push" system and dispatch lists can be labor intensive and subject to inaccuracy. The demand-pull system herein assumes that if a WO has been created by MRP and accepted into production, that it is valid and should move through production as expeditiously as possible. Sequencing of work is a two-step process: 1. First the WO must be authorized (Pull-tagged) based on its priority and downstream demand; 2. Once authorized, WOs are pulled into production on a First-Authorized, First-Out (FAFO) basis: the first WO in a WC's queue to be assigned a PT is the first one to be worked on. There are over-ride provisions in the system, but the present demand-pull system works automatically based on FAFO. The authors prefer that the priority-setting method for the authorization step be First-In-First-out, but other methods have been discussed in Section II of this disclosure.

Although the present inventions have been described in terms of preferred and alternative embodiments above, numerous modifications and/or additions to the above-described embodiments would be readily apparent to one skilled in the art. The embodiments can be defined as methods of use carried out by anyone, any subset of or all of the components and/or users; as systems of one or more components in a certain structural and/or functional relationship; and/or as subassemblies or sub-methods. The inventions can include each of the individual components separately. However, it is intended that the scope of the present inventions extend to all such modifications and/or additions and that the scopes of the present inventions are limited solely by the claims set forth herein. The inventions include the methods being included or distributed in floppy disks, CD-ROMs, DVDs, over the Internet, as a programmed computer, a processor and a non-transitory computer-readable medium, and others as would be apparent to those skilled in the art in view of this disclosure.

Although the terms first, second, third and so forth may be used herein to describe various members, elements, components, regions, layers and/or sections, these members, elements, components, regions, layers and/or sections should not be limited by these terms. These terms may be used to distinguish one element, component, region, layer or section from another region, layer or section. Terms such as "first," "second" and other numerical terms when used herein do not imply a sequence or order unless clearly indicated by the context. Thus, a first member, element, component, region, layer or section discussed below can be termed a second member, element, component, region, layer or section without departing from the aspects of the present teachings.

The invention claimed is:

1. A method for managing time-based demand-pull production of work orders, the method comprising:
   identifying, by a processor at a server, a plurality of connections between the server and a plurality of electronic devices, each of the electronic devices respectively corresponding to a work center from among a plurality of work centers, each work center having a corresponding work order queue; and
   controlling, by the processor, authorizing new work orders at the work centers by:
      storing, by the processor, status information from the electronic devices and company databases regarding the state of the work centers, including a subject work center and adjacent work centers that are immediately upstream of the subject work center, the status information comprising status of work orders for the subject and adjacent work centers, the capacity of the subject and upstream adjacent work centers, and the transit times between the subject and upstream adjacent work centers;
      querying, by the processor, data from a database to identify a next work order to be authorized for production at one of the upstream adjacent work centers based on a priority-setting rule;
      determining, by the processor, need time comprising an amount of time until the subject work center is available to start work on the next work order in accordance with an amount of time to clear the corresponding work order queue of the subject work center, and an amount of time to clear authorized work orders of the upstream adjacent work centers;
      determining, by the processor, arrival time comprising an amount of time until the next work order will arrive at the subject work center if immediately authorized in accordance with one or more of:
         (i) remaining clear time for the upstream adjacent work center in which the next work order is located;
         (ii) an amount of time to clear any previously authorized work orders in the corresponding work queue of the upstream adjacent work center in which the next work order is located;
         (iii) an amount of time needed to process the next work order through the upstream adjacent work center in which the next work order is located; and
         (iv) an amount of time to transit the next work order from the upstream adjacent work center in which the next work order is located to the subject work center;
      determining, by the processor, for each work center, in accordance with time-based demand pull authorization, whether the arrival time is greater than or equal to the need time of the subject work center;
      transmitting, by the processor, an authorization signal to authorize production of the next work order at the upstream adjacent work center if the arrival time is greater than or equal to the need time of the subject work center;

modifying, by the processor, the corresponding work order queue of the upstream work center in response to the authorization signal; and repeating the controlling step upon a change of state of at least one work center, for repetitively generating signals to dynamically authorize the movement of work orders across multiple work centers.

2. The method of claim 1, further comprising storing, by the processor, transactional data, the transactional data comprising:

start and finish times and quantities and defects for work orders;
authorization times for work orders;
hold status changes;
work center capacities; and
work center work schedules.

3. The method of claim 2, wherein work orders are pulled from the corresponding work order queue of the work centers based on the authorization times for the work orders.

4. The method of claim 1, further comprising:

receiving, by the processor, a query from one or more of the electronic devices; and in response to the query, transmitting, by the processor, a signal to the one or more of the electronic devices for displaying authorization and status information on a display associated with the one or more electronic devices.

5. The method of claim 1, wherein the priority-setting rule is first-in first-out.

6. The method of claim 1, wherein the priority-setting rule is based on due-date slack.

7. The method of claim 1, wherein the priority-setting rule is based on expedite policies.

8. The method of claim 1, wherein the priority-setting rule is based on a numerical priority setting.

9. The method of claim 1, further comprising adjusting, by the processor, the remaining clear time based on defect data corresponding to the work center.

10. The method of claim 1, further comprising authorizing, by the processor, incoming work based on throughput of the work center.

11. The method of claim 1, further comprising adjusting the amount of time until the work center is available based on a splitting of a work order into multiple batches.

12. The method of claim 1, further comprising setting a queue policy for each work center, the queue policy adjusting a maximum queue level for the corresponding work order queue of the work center.

13. The method of claim 1, further comprising, after transmitting the authorization signal to initiate the next work order, assigning a pull tag for storing production data for the next work order at the work center.

14. The method of claim 1, further comprising continuously maintaining the database, by the processor, with the status information received from the electronic devices regarding the state of each of the work centers and the corresponding work order queues, wherein the controlling authorizing new work orders at the work centers is performed in accordance with the status information most recently obtained from the work centers.

15. A system for managing time-based demand-pull production of work orders, the system comprising:

a server comprising a processor; and a memory coupled to the processor, wherein the memory stores instructions that, when executed by the processor, cause the processor to:

identify a plurality of connections between the server and a plurality of electronic devices, each of the electronic devices respectively corresponding to a work center from among a plurality of work centers, each work center having a corresponding work order queue; and control authorizing new work orders at the work centers, such that the instructions further cause the processor to:

store status information from the electronic devices and company databases regarding the state of the work centers and work orders, including a subject work center and adjacent work centers that are immediately upstream of the subject work center, the status information comprising status of work orders for the subject and adjacent work centers, the capacity of the subject and upstream adjacent work centers, and the transit times between the subject and upstream adjacent work centers;

query data from a database to identify a next work order to be authorized for production at one of the upstream adjacent work centers based on a priority-setting rule;

calculate need time comprising an amount of time until the subject work center is available to start work on the next work order in accordance with an amount of time to clear the corresponding work order queue of the subject work center, and an amount of time to clear authorized work orders of the upstream adjacent work centers;

compare arrival time comprising an amount of time until the next work order will arrive at the subject work center if immediately authorized in accordance with one or more of:

(i) remaining clear time for the upstream adjacent work center in which the next work order is located;

(ii) an amount of time to clear any previously authorized work orders in the corresponding work queue of the upstream adjacent work center in which the next work order is located;

(iii) an amount of time needed to process the next work order through the upstream adjacent work center in which the next work order is located; and (iv) an amount of time to transit the next work order from the upstream adjacent work center in which the next work order is located to the subject work center;

determine for each work center, in accordance with time-based demand pull authorization, whether the arrival time is greater than or equal to the need time of the subject work center;

transmit an authorization signal to authorize production of the next work order at the upstream adjacent work center if the arrival time is greater than or equal to the need time of the subject work center;

modify the corresponding work order queue of the upstream work center in response to the authorization signal; and repeat the controlling step upon a change of state of at least one work center, for repetitively generating signals to dynamically authorize the movement of work orders across multiple work centers.

16. The system of claim 15, wherein the instructions further cause the processor to store transactional data, the transactional data comprising:
- start and finish times and quantities and defects for work orders;
- authorization times for work orders;
- hold status changes;
- work center capacities; and
- work center work schedules.

17. The system of claim 16, wherein work orders are pulled from the corresponding work order queue of the work centers based on the authorization times for the work orders.

18. The system of claim 15, wherein the instructions further cause the processor to:
- receive a query from one or more of the electronic devices; and
- in response to the query, transmit a signal to the one or more of the electronic devices for displaying authorization and status information on a display associated with the one or more electronic devices.

19. The system of claim 15, wherein the priority-setting rule is first-in first-out.

20. The system of claim 15, wherein the priority-setting rule is based on due-date slack.

21. The system of claim 15, wherein the priority-setting rule is based on expedite policies.

22. The system of claim 15, wherein the priority-setting rule is based on a numerical priority setting.

23. The system of claim 15, wherein the instructions further cause the processor to adjust the remaining clear time based on defect data corresponding to the work center.

24. The system of claim 15, wherein the instructions further cause the processor to authorize incoming work based on throughput of the work center.

25. The system of claim 15, wherein the instructions further cause the processor to adjust the amount of time until the work center is available based on a splitting of a work order into multiple batches.

26. The system of claim 15, wherein the instructions allow a queue policy to be set for each work center, the queue policy adjusting a maximum queue level for the corresponding work order queue of the work center.

27. The system of claim 15, wherein, after transmitting the authorization signal to initiate the next work order, a pull tag is assigned for storing production data for the next work order at the work center.

28. The system of claim 15, wherein the instructions further cause the processor to continuously maintain the database with the status information received from the electronic devices regarding the state of each of the work centers and each of the corresponding work order queues,
- wherein the instructions further cause the processor to control the authorizing new work orders in accordance with the status information most recently obtained from the work centers.

* * * * *